United States Patent
Sarah et al.

(10) Patent No.: US 12,367,249 B2
(45) Date of Patent: Jul. 22, 2025

(54) FRAMEWORK FOR OPTIMIZATION OF MACHINE LEARNING ARCHITECTURES

(71) Applicant: Intel Corporation, Santa Clara, CA (US)

(72) Inventors: Anthony Sarah, San Diego, CA (US); Daniel Cummings, Austin, TX (US); Juan Pablo Munoz, Folsom, CA (US); Tristan Webb, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 447 days.

(21) Appl. No.: 17/505,568

(22) Filed: Oct. 19, 2021

(65) Prior Publication Data

US 2022/0035878 A1 Feb. 3, 2022

(51) Int. Cl.
*G06F 16/953* (2019.01)
*G06N 5/02* (2023.01)

(52) U.S. Cl.
CPC ........... *G06F 16/953* (2019.01); *G06N 5/027* (2013.01)

(58) Field of Classification Search
CPC .............................. G06F 16/953; G06N 5/027
See application file for complete search history.

(56) References Cited

U.S. PATENT DOCUMENTS

| | | | |
|---|---|---|---|
| 10,528,891 B1* | 1/2020 | Cheng | G06N 20/20 |
| 10,744,372 B2* | 8/2020 | Meyerson | G06F 16/23 |
| 10,803,392 B1 | 10/2020 | Khan et al. | |
| 11,347,995 B2* | 5/2022 | Bender | G06N 3/04 |
| 11,443,162 B2* | 9/2022 | Yang | G06F 16/9024 |
| 11,527,308 B2* | 12/2022 | Shahrzad | G06F 18/2115 |
| 11,531,861 B2* | 12/2022 | Tan | G06N 3/044 |
| 11,620,515 B2 | 4/2023 | Liu | |
| 2007/0208548 A1 | 9/2007 | McConaghy | |

(Continued)

FOREIGN PATENT DOCUMENTS

| EP | 3975060 A1 | 3/2022 |
|---|---|---|
| WO | WO2021158313 A1 | 8/2021 |

OTHER PUBLICATIONS

Dzmitry Bahdanau et al., "Neural Machine Translation by Jointly Learning to Align and Translate", May 19, 2016, 15 pages, arXiv:1409.0473v7 [cs.CL].

(Continued)

*Primary Examiner* — Mark E Hershley
(74) *Attorney, Agent, or Firm* — Hanley, Flight & Zimmerman, LLC

(57) ABSTRACT

The present disclosure is related to framework for automatically and efficiently finding machine learning (ML) architectures that are optimized to one or more specified performance metrics and/or hardware platforms. This framework provides ML architectures that are applicable to specified ML domains and are optimized for specified hardware platforms in significantly less time than could be done manually and in less time than existing ML model searching techniques. Furthermore, a user interface is provided that allows a user to search for different ML architectures based on modified search parameters, such as different hardware platform aspects and/or performance metrics. Other embodiments may be described and/or claimed.

22 Claims, 8 Drawing Sheets

(56) References Cited

U.S. PATENT DOCUMENTS

| | | | |
|---|---|---|---|
| 2010/0325072 A1* | 12/2010 | Truemper | G06N 20/00 706/46 |
| 2013/0185234 A1* | 7/2013 | Arora | G06N 3/126 706/13 |
| 2015/0095253 A1* | 4/2015 | Lim | G06Q 10/00 705/327 |
| 2016/0328644 A1 | 11/2016 | Lin et al. | |
| 2017/0220928 A1* | 8/2017 | Hajizadeh | G06Q 10/0637 |
| 2017/0261949 A1 | 9/2017 | Hoffmann et al. | |
| 2018/0137219 A1* | 5/2018 | Goldfarb | G06N 3/126 |
| 2019/0005390 A1 | 1/2019 | Stitt et al. | |
| 2019/0019096 A1* | 1/2019 | Yoshida | G06F 16/9024 |
| 2019/0279102 A1 | 9/2019 | Cataltepe | |
| 2019/0286984 A1* | 9/2019 | Vasudevan | G06N 5/01 |
| 2019/0347548 A1* | 11/2019 | Amizadeh | G06N 3/08 |
| 2019/0354837 A1* | 11/2019 | Zhou | G06N 3/044 |
| 2019/0370659 A1* | 12/2019 | Dean | G06F 11/3495 |
| 2020/0044955 A1 | 2/2020 | Pugaczewski | |
| 2020/0057965 A1 | 2/2020 | Howard | |
| 2020/0104710 A1* | 4/2020 | Vasudevan | G06N 3/045 |
| 2020/0104715 A1* | 4/2020 | Denolf | G06N 3/086 |
| 2020/0125545 A1* | 4/2020 | Idicula | G06N 20/20 |
| 2020/0143227 A1 | 5/2020 | Tan et al. | |
| 2020/0143243 A1* | 5/2020 | Liang | G06N 3/045 |
| 2020/0167593 A1 | 5/2020 | Kim | |
| 2020/0193266 A1* | 6/2020 | Scheidegger | G06N 3/04 |
| 2020/0272909 A1* | 8/2020 | Parmentier | G06N 3/126 |
| 2020/0311561 A1 | 10/2020 | Naaman et al. | |
| 2020/0320399 A1 | 10/2020 | Huang et al. | |
| 2020/0349050 A1 | 11/2020 | Ghobadi | |
| 2020/0357486 A1* | 11/2020 | Kok | G06N 20/00 |
| 2020/0401899 A1* | 12/2020 | Dohan | G06N 3/048 |
| 2021/0034924 A1* | 2/2021 | McCourt | G06N 20/00 |
| 2021/0056378 A1* | 2/2021 | Yang | G06F 16/9024 |
| 2021/0064627 A1 | 3/2021 | Kleiner et al. | |
| 2021/0081763 A1* | 3/2021 | Abdelfattah | G06N 20/00 |
| 2021/0097383 A1 | 4/2021 | Kaur | |
| 2021/0097443 A1* | 4/2021 | Li | G06N 5/04 |
| 2021/0110140 A1 | 4/2021 | Munoz et al. | |
| 2021/0110276 A1* | 4/2021 | Chu | G06N 7/01 |
| 2021/0110302 A1* | 4/2021 | Nam | G06N 5/01 |
| 2021/0158929 A1 | 5/2021 | Sjolund | |
| 2021/0303967 A1 | 9/2021 | Bender | |
| 2021/0304061 A1 | 9/2021 | Kolar et al. | |
| 2021/0350233 A1 | 11/2021 | Saboori et al. | |
| 2021/0357744 A1* | 11/2021 | Mittal | G06F 18/213 |
| 2021/0357959 A1 | 11/2021 | Cella | |
| 2021/0390376 A1* | 12/2021 | Byrne | G06N 3/045 |
| 2022/0012089 A1 | 1/2022 | Nasr-Azadani et al. | |
| 2022/0019880 A1* | 1/2022 | Dasgupta | G06N 3/04 |
| 2022/0027792 A1 | 1/2022 | Cummings et al. | |
| 2022/0035877 A1* | 2/2022 | Nittur Sridhar | G06N 3/086 |
| 2022/0035878 A1 | 2/2022 | Sarah et al. | |
| 2022/0036128 A1 | 2/2022 | Levanony | |
| 2022/0036194 A1* | 2/2022 | Sundaresan | G06N 3/063 |
| 2022/0172038 A1* | 6/2022 | Chen | G06N 3/045 |
| 2022/0180125 A1 | 6/2022 | Shen et al. | |
| 2022/0198217 A1* | 6/2022 | Dong | G06F 18/2163 |
| 2022/0198260 A1* | 6/2022 | Xue | G06N 3/086 |
| 2022/0230048 A1* | 7/2022 | Li | G06N 3/08 |
| 2022/0269835 A1* | 8/2022 | Yang | G06N 7/01 |
| 2022/0277231 A1 | 9/2022 | Ostergaard et al. | |
| 2022/0284582 A1* | 9/2022 | Yang | G06N 3/082 |
| 2022/0328128 A1 | 10/2022 | Kok | |
| 2022/0348903 A1 | 11/2022 | Ranganathan et al. | |
| 2022/0398500 A1 | 12/2022 | Singhal | |
| 2022/0414534 A1* | 12/2022 | Ananthanarayanan | G06N 20/00 |
| 2023/0032748 A1 | 2/2023 | Sodhi | |
| 2023/0274151 A1* | 8/2023 | Xu | G06N 3/086 706/15 |
| 2023/0325711 A1* | 10/2023 | Haraldson | G06N 3/084 706/12 |
| 2024/0007414 A1* | 1/2024 | Jain | G06F 9/5088 |
| 2024/0046148 A1* | 2/2024 | Bega | G06N 20/00 |
| 2024/0289687 A1 | 8/2024 | Kumar et al. | |
| 2024/0362472 A1* | 10/2024 | Fu | G06N 3/088 |

OTHER PUBLICATIONS

Irwan Bello et al., "Attention Augmented Convolutional Networks", 2019, pp. 3286-3295, Proceedings of the IEEE/CVF Int'l Conference on Computer Vision.

Cristian Buciluă et al., "Model Compression", Aug. 20, 2006, pp. 535-541, Proceedings of the 12th Assn. for Computing Machinery (ACM) Special Interest Group on Knowledge Discovery in Data (SIGKDD) Int'l Conference on Knowledge Discovery and Data Mining (KDD).

Liang-Chieh Chen et al., "Deeplab: Semantic Image Segmentation with Deep Convolutional Nets, Atrous Convolution, and Fully Connected CRFs", Apr. 27, 2017, pp. 834-848, IEEE transactions on pattern analysis and machine intelligence, vol. 40, No. 4.

Yu Cheng et al., "A Survey of Model Compression and Acceleration for Deep Neural Networks", Jun. 14, 2020, 10 pages, arXiv:1710.09282v9 [cs.LG].

Aston Zhang et al., "Dive into Deep Learning" Jul. 25, 2021, 323 pages, Release 0.17.0, chs. 4-10 (Jul. 25, 2021), available at: https://d2l.ai/.

Tim Dettmers et al., "Sparse Networks from Scratch: Faster Training without Losing Performance", Aug. 23, 2019, 14 pages, arXiv:1907.04840v2 [cs.LG].

Yu Cheng et al., "A Survey of Model Compression and Acceleration for Deep Neural Networks", Oct. 23, 2017, 10 pages, IEEE Signal Processing Magazine, Special Issue on Deep Learning for Image Understanding.

Alex Krizhevsky et al., "Learning Multiple Layers of Features from Tiny Images", Master's Thesis, U. of Toronto, Citeseer, 60 pages (Apr. 8, 2009), https://www.cs.toronto.edu/~kriz/learning-features-2009-TR.pdf.

Souvik Kundu et al., "A Tunable Robust Pruning Framework Through Dynamic Network Rewiring of DNNS", arXiv:2011.03083v2 [cs.CV], 8 pages (Nov. 24, 2020).

Namhoon Lee et al., "SNIP: Single-Shot Network Pruning based on Connection Sensitivity", Int'l Conference on Learning Representations (ICLR) 2019, 15 pages (May 6, 2019).

Tsung-Yi Lin et al., "Feature Pyramid Networks for Object Detection", Proceedings of the IEEE Conference on Computer Vision and Pattern Recognition 2017, pp. 2117-2125 (2017).

Zhuang Liu et al., "Rethinking the Value of Network Pruning", arXiv:1810.05270v2 [cs.LG], 21 pages (Mar. 5, 2019).

Marc E. McDill, "Forest Resource Management", Penn State Univ., ch. 11, pp. 203-233 (Jun. 22, 1999), https://faculty.washington.edu/toths/Presentations/Lecture%202/Ch11_LPIntro.pdf.

Hesham Mostafa et al., "Parameter Efficient Training of Deep Convolutional Neural Networks by Dynamic Sparse Reparameterization", Proceedings of the 36th Int'l Conference on Machine Learning (PMLR), pp. 4646-4655 (May 24, 2019), http://proceedings.mlr.press/v97/mostafa19a/mostafa19a.pdf.

Junki Park et al., "OPTIMUS: Optimized Matrix Multiplication Structure for Transformer Neural Network Accelerator", Mar. 15, 2020, pp. 363-378, Proceedings of Machine Learning and Systems, vol. 2.

Prajit Ramachandran et al., "Stand-Alone Self-Attention in Vision Models", arXiv:1906.05909v1 [cs.CV], 15 pages (Jun. 13, 2019), https://arxiv.org/pdf/1906.05909.pdf.

Christian Szegedy et al., "Going Deeper with Convolutions", 2015 IEEE Conference on Computer Vision and Pattern Recognition (CVPR), pp. 1-9 (2015), doi: 10.1109/CVPR.2015.7298594.

James Bergstra et al., "Algorithms for Hyper-Parameter Optimization", 2011, 9 pages, Advances in Neural Information Processing Systems 24 (NIPS 2011).

James Bergstra et al., "Random Search for Hyper-Parameter Optimization", Feb. 1, 2012, 25 pages, J. of Machine Learning Research, vol. 13, No. 2.

(56) References Cited

OTHER PUBLICATIONS

Han Cai et al., "Once-For-All: Train One Network and Specialize for Efficient Deployment", Apr. 29, 2020, 15 pages, arXiv:1908.09791v5 [cs.LG].

Kalyanmoy Deb et al., "A Fast and Elitist Multiobjective Genetic Algorithm: NSGA-II", Apr. 2002, 16 pages, IEEE Transactions on Evolutionary Computation, vol. 6, No. 2.

Ian Dewancker et al., "Bayesian Optimization Primer", 2020, 4 pages. Retrieved from the Internet: http://static.sigopt.com/b/20a144d208ef255d3b981ce419667ec25d8412e2/static/pdf/SigOpt_Bayesian_Optimization_Primer.pdf.

Ian Dewancker et al., "Bayesian Optimization for Machine Learning: A Practical Guidebook", Dec. 14, 2016, 15 pages, arXiv preprint arXiv:1612.04858.

A.E. Eiben et al., "Introduction to Evolutionary Computing", 2015,295 pages, second edition, Springer Heidelberg New York Dordrecht London.

Wenlan Huang et al., "Survey on Multi-Objective Evolutionary Algorithms", Aug. 1, 2019, 8 pages, IOP Conf. Series: J. of Physics: Conf. Series, vol. 1288, No. 1, p. 012057.

Christian Igel et al., "Covariance Matrix Adaptation for Multi-objective Optimization", 2007, pp. 1-28, Evolutionary Computation, vol. 15, No. 1.

Danilo Vasconcellos Vargas et al., "General Subpopulation Framework and Taming the Conflict Inside Populations", Jan. 2, 2019, 37 pages, arXiv:1901.00266v1 [cs.NE].

Extended European Search Report mailed Jan. 2, 2023 for European Patent Application No. 22186944.9, 14 pages.

Tang et al., "A Semi-Supervised Assessor of Neural Architectures", arXiv:2005.06821v1 [cs.CV], arxiv.org, Cornell Univ. Library, Ithaca, NY, 10 pages (May 14, 2020).

Kokiopoulou et al., "Fast Task-Aware Architecture Inference", arXiv:1902.05781v1 [cs.LG], arxiv.org, Cornell Univ. Library, Ithaca, NY, 10 pages (Feb. 15, 2019).

Zichao Lu et al., "NSGANetV2: Evolutionary Multi-objective Surrogate-Assisted Neural Architecture Search", Computer Vision—ECCV 2020: 16th European Conference, Glasgow, UK, Aug. 23-28, 2020, pp. 35-51 (Aug. 2020).

Extended European Search Report mailed Jan. 10, 2023 for European Patent Application No. 22186932.4, 9 pages.

"Intel Agilex FSeries 027 FPGA R25A Product Specifications" retrieved on Oct. 6, 2021, 3 pages. Retrieved from Internet at: https://www.intel.com/content/www/us/en/products/sku/208599/intel-agilex-fseries-027-fpga-r25a/specifications.html.

"Intel Atom x6413E Processor Product Specifications", retrieved on Oct. 6, 2021, 4 pages. Retrieved from Internet at https://ark.intel.com/content/www/us/en/ark/products/207908/intel-atom-x6413e-processor-1-5m-cache-up-to-3-00-ghz.html.

"Intel® Xeon® Platinum 8362 Processor Product Specifications" retrieved on Oct. 6, 2021, 4 pages. Retrieved from internet at: https://www.intel.com/content/www/us/en/products/sku/217216/intel-xeon-platinum-8362-processor-48m-cache-2-80-ghz/specifications.html.

Mahrokh Javadi et al., "Combining Manhattan and Crowding distances in Decision Space for Multimodal Multi- objective Optimization Problems", Sep. 12, 2019, 6 pages, Eurogen 2019.

Will Koehrsen, "A Conceptual Explanation of Bayesian Hyperparameter Optimization for Machine Learning", Jun. 28, 2018. 17 pages, Toward Data Science, available at: https://towardsdatascience.com/a-conceptual-explanation-of-bayesian-model-based-hyperparameter-optimization-for-machine-learning-b8172278050f.

Hanxiao Liu et al., "DARTS: Differentiable Architecture Search", Apr. 23, 2019, 13 pages, arXiv:1806.09055v2 [cs.LG].

Joseph Mellor et al., "Neural Architecture Search without Training", Jul. 1, 2021, pp. 7588-7598, Int'l Conference on Machine Learning, PMLR.

Jasper Snoek et al., "Practical Bayesian Optimization of Machine Learning Algorithms", Aug. 29, 2012, 9 pages, Advances in Neural Information Processing Systems 25 (NIPS 2012).

Eckart Zitzler et al., "SPEA2: Improving the Strength Pareto Evolutionary Algorithm", May 2001, 21 pages, Computer Engineering and Communication Networks Lab (TIK), Swiss Fed. Inst. of Tech. (ETH), Zurich, Ch, TIK-Report 103.

Hanrui Wang et al., "HAT: Hardware-Aware Transformers for Efficient Natural Language Processing", May 28, 2020, 14 pages, arXiv:2005.14187v1 [cs.CL].

Hanrui Wang et al., "HAT: Hardware-Aware Transformers for Efficient Natural Language Processing", 2020, 37 pages, ACL 2020 Slides, available at: https://hat.mit.edu/assets/ACL20_HAT_HanruiWang.pdf.

Kalyanmoy Deb, "Multi-Objective Optimization Using Evolutionary Algorithms", Indian Institute of Technology—Kanpur, Dept. of Mechanical Engineering, Kanpur, India, KanGAL Report No. 2011003, 24 pages (Feb. 10, 2011), https://www.egr.msu.edu/~kdeb/papers/k2011003.pdf.

Zhichao Lu et al., "NSGA-Net: Neural Architecture Search using Multi-Objective Genetic Algorithm", arXiv:1810.03522v2 [cs.CV], 13 pages (Apr. 18, 2019).

Yonglong Tian et al., "Contrastive Representation Distillation", arXiv:1910.10699v2 [cs.LG], 19 pages (Jan. 18, 2020).

Tianyun Zhang et al., "A Systematic DNN Weight Pruning Framework using Alternating Direction Method of Multipliers", Proceedings of the European Conference on Computer Vision (ECCV) 2018, in Lecture Notes in Computer Science book series (LNCS), vol. 11212, pp. 191-207 (Oct. 7, 2018), https://openaccess.thecvf.com/content_ECCV_2018/papers/Tianyun_Zhang_A_Systematic_DNN_ECCV_2018_paper.pdf.

Ashish Vaswani et al., "Attention Is All You Need", Advances in Neural Information Processing Systems 30 (NIPS 2017), pp. 5998-6008 (2017), https://proceedings.neurips.cc/paper/2017/file/3f5ee243547dee91fbd053c1c4a845aa-Paper.pdf.

Chunnan Wang et al., "Multi-Objective Neural Architecture Search Based on Diverse Structures and Adaptive Recommendation", arXiv:2007.02749v2 [cs.CV], 11 pages (Aug. 13, 2020), https://arxiv.org/pdf/2007.02749.pdf.

Sergey Zagoruyko et al., "Paying More Attention to Attention: Improving the Performance of Convolutional Neural Networks via Attention Transfer", arXiv:1612.03928v3 [cs.CV], 13 pages (Feb. 12, 2017), https://arxiv.org/pdf/1612.03928.pdf.

Chenzhuo Zhu et al., "Trained Ternary Quantization", arXiv:1612.01064v3 [cs.LG], 10 pages (Feb. 23, 2017), https://arxiv.org/pdf/1612.01064.pdf.

Barret Zoph et al., "Learning Transferable Architectures for Scalable Image Recognition", Proceedings of the IEEE conference on computer vision and pattern recognition 2018, pp. 8697-8710 (2018), https://openaccess.thecvf.com/content_cvpr_2018/papers/Zoph_Learning_Transferable_Architectures_CVPR_2018_paper.pdf.

Mohamed S. Abdelfattah et al., "Zero-Cost Proxies for Lightweight NAS", Mar. 19, 2021, 17 pages, arXiv:2101.08134v2 [cs.LG].

Edward Alibekov et al., "Proxy Functions for Approximate Reinforcement Learning", 2019, pp. 224-229, IFAC PapersOnLine 52-11.

Bowen Baker et al., "Designing Neural Network Architectures using Reinforcement Learning", Mar. 22, 2017, 18 pages, arXiv:1611.02167v3.

Han Cai et al., "Proxylessnas: Direct neural architecture search on target task and hardware", Feb. 23, 2019, 13 pages, arXiv:1812.00332v2 [cs.LG].

Olivier Chapelle et al., "Semi-Supervised Learning", 2006, 524 pages, MIT Press, Cambridge MA, London England.

Thomas Elsken et al., "Neural architecture search: A survey", Mar. 19, 2019, 21 pages, J. of Machine Learning Research, vol. 20, No. 1.

Thomas N. Kipf et al., "Semi-Supervised Classification with Graph Convolutional Networks", Feb. 22, 2017, 14 pages, arXiv:1609.02907v4.

M. Z. Naser et al., "Insights into Performance Fitness and Error Metrics for Machine Learning", May 17, 2020, 25 pages, arXiv:2006.00887v1.

Kenneth O. Stanley et al., "Evolving Neural Networks through Augmenting Topologies", Jun. 2002, pp. 99-127, Evolutionary Computation, vol. 10, No. 2.

(56) References Cited

OTHER PUBLICATIONS

Mingxing Tan et al., "EfficientNet: Rethinking Model Scaling for Convolutional Neural Networks", May 24, 2019, pp. 6105-6114 , Int'l Conference on Machine Learning, PMLR.

Jack Turner et al., "BlockSwap: Fisher-guided Block Substitution for Network Compression on a Budget", Jan. 23, 2020, 15 pages, arXiv:1906.04113v2.

Jesper E. Van Engelen et al., "A survey on semi-supervised learning", Nov. 15, 2019, pp. 373-440, Machine Learning, vol. 109, No. 2.

Barret Zoph et al., "Neural Architecture Search with Reinforcement Learning", Feb. 15, 2017, 16 pages, arXiv: 1611.01578v2.

Song Han et al., "Deep Compression: Compressing Deep Neural Networks with Pruning, Trained Quantization and Huffman Coding", arXiv:1510.00149v5 [cs.CV], 14 pages (Feb. 15, 2016).

Andrew Howard et al., "Searching for MobileNetV3", Proceedings of the IEEE/Computer Vision Foundation (CVF) Int'l Conference on Computer Vision (ICCV 2019), pp. 1314-1324 (Oct. 2019).

Liam Li et al., "Geometry-Aware Gradient Algorithms for Neural Architecture Search", arXiv:2004.07802v5 [cs.LG], 25 pages (Mar. 18, 2021).

Mu Li et al., "Scaling Distributed Machine Learning with the Parameter Server", 11th USENIX Symposium on Operating Systems Design and Implementation (OSDI '14), pp. 583-598 (Oct. 2014).

Misha Khodak et al., "In defense of weight-sharing for neural architecture search: an optimization perspective", Machine Learning Blog Carnegie Mellon University (ML@CMU), 12 pages (Jul. 17, 2020), https://blog.ml.cmu.edu/2020/07/17/in-defense-of-weight-sharing-for-nas/.

Hieu Pham et al. "Efficient Neural Architecture Search via Parameters Sharing", Proceedings of the 35th Int'l Conference on Machine Learning (PMLR), vol. 80, pp. 4095-4104 (2018).

Aurick Qiao et al., "Litz: Elastic Framework for High-Performance DistributedMachine Learning", 2018 USENIX Annual Technical Conference (USENIX ATC '18), pp. 631-643 (Jul. 2018).

Mohammad Rastegari et al. "XNOR-Net: Imagenet Classification Using Binary Convolutional Neural Networks", European Conference on Computer Vision (ECCV), Springer, Cham., pp. 525-542 (Oct. 8, 2016).

Lingxi Xie et al., "Weight-Sharing Neural Architecture Search: A Battle to Shrink the Optimization Gap", arXiv:2008.01475v2 [cs.CV], 24 pages (Aug. 5, 2020).

Yuge Zhang et al., "Deeper Insights Into Weight Sharing in Neural Architecture Search", arXiv:2001.01431v1 [cs.LG], 16 pages (Jan. 6, 2020).

Jonathan Frankle et al., "The Lottery Ticket Hypothesis: Finding Sparse, Trainable Neural Networks", arXiv:1803.03635v5 [cs.LG], 42 pages (Mar. 4, 2019), https://arxiv.org/pdf/1803.03635.pdf.

Jianping Gou et al., "Knowledge distillation: A survey", Int'l J. of Comp. Vision, vol. 129, No. 6, pp. 1789-1819 (Jun. 2021), https://arxiv.org/pdf/2006.05525.pdf.

Lucas Hansen, "Tiny ImageNet Challenge Submission", CS231n: Convolutional Neural Networks for Visual Recognition, Stanford University, 6 pages (2015), http://cs231n.stanford.edu/reports/2015/pdfs/lucash_final.pdf.

Kaiming He et al., "Deep Residual Learning for Image Recognition", Proceedings of the IEEE conference on computer vision and pattern recognition 2016, pp. 770-778 (2016), https:/openaccess.thecvf.com/content_cvpr_2016/papers/He_Deep_Residual_Learning_CVPR_2016_paper.pdf.

Adrián Hernández et al., "Attention Mechanisms and Their Applications to Complex Systems", Entropy, vol. 23, No. 3, p. 283, 18 pages (Feb. 26, 2021), https://www.mdpi.com/1099-4300/23/3/283/htm.

Geoffrey Hinton et al., "Distilling the Knowledge in a Neural Network", arXiv preprint arXiv:1503.02531, 9 pages (Mar. 9, 2015), https://arxiv.org/pdf/1503.02531.pdf.

Le Hou et al., "High Resolution Medical Image Analysis with Spatial Partitioning", arXiv:1909.03108v3 [eess.IV], 5 pages (Sep. 12, 2019), https://arxiv.org/pdf/1909.03108.pdf.

Cheng-Zhi Anna Huang et al., "Music Transformer: Generating Music with Long-Term Structure", arXiv:1809.04281v3 [cs.LG], 14 pages (Dec. 12, 2018), https://arxiv.org/pdf/1809.04281.pdf.

Judit Ács, "Masking attention weights in PyTorch", Judit Ács's blog, 4 pages (Dec. 27, 2018; last visited Oct. 2, 2021), http://juditacs.github.io/2018/12/27/masked-attention.html.

Salman Khan et al., "Transformers in Vision: A Survey", arXiv:2101.01169v2 [cs.CV], 28 pages (Feb. 22, 2021), https://arxiv.org/pdf/2101.01169v2.pdf.

Taehyeon Kim et al., "Comparing Kullback-Leibler Divergence and Mean Squared Error Loss in Knowledge Distillation", 2021, pp. 2628-2635, (Proceedings of the Thirtieth International Joint Conference on Artificial Intelligence (IJCAI-21), 2021).

Taehyeon Kim et al., "Comparing Kullback-Leibler Divergence and Mean Squared Error Loss in Knowledge Distillation", May 19, 2021, 11 pages, arXiv:2105.08919 [cs.LG].

Salman Khan et al., "Transformers in Vision: A Survey", ACM Computing Surveys, 38 pages (Accepted Dec. 2021; available online Jan. 6, 2022), https://dl.acm.org/doi/abs/10.1145/3505244.

United States Patent and Trademark Office, "Notice of Allowance and Fee(s) Due," issued in connection with U.S. Appl. No. 17/504,996, dated Sep. 16, 2024, 8 pages.

United States Patent and Trademark Office, "Non-Final Office Action," issued in connection with U.S. Appl. No. 17/504,996, dated Mar. 8, 2024, 19 pages.

United States Patent and Trademark Office, "Notice of Allowance and Fee(s) Due," issued in connection with U.S. Appl. No. 17/504,996, dated Oct. 25, 2024, 8 pages.

United States Patent and Trademark Office, "Non-Final Office Action," issued in connection with U.S. Patent Application No. 17/506, 161, dated Jan. 30, 2025, 34 pages.

United States Patent and Trademark Office, "Notice of Allowance and Fee(s) Due," issued in connection with U.S. Appl. No. 17/504,996, dated Mar. 12, 2025, 9 pages.

United States Patent and Trademark Office, "Non-Final Office Action," issued in connection with U.S. Appl. No. 17/506,161, dated Jan. 30, 2025, 34 pages.

United States Patent and Trademark Office, "Notice of Allowability," issued in connection with U.S. Appl. No. 17/504,996, dated Apr. 28, 2025, 2 pages.

United States Patent and Trademark Office, "Non-Final Office Action," issued in connection with U.S. Appl. No. 17/497,736 dated May 7, 2025, 36 pages.

United States Patent and Trademark Office, "Notice of Allowance and Fee(s) Due," issued in connection with U.S. Appl. No. 17/506,161, dated May 19, 2025, 5 pages.

* cited by examiner

FRAMEWORK FOR OPTIMIZATION OF MACHINE LEARNING ARCHITECTURES

TECHNICAL FIELD

Embodiments described herein generally relate to artificial intelligence (AI), machine learning (ML), and Neural Architecture Search (NAS) technologies, and in particular, to techniques for optimizing AI/ML architectures.

BACKGROUND

Machine learning (ML) is the study of computer algorithms that improve automatically through experience and by the use of data. Performing machine learning involves creating a statistical model (or simply a "model"), which is configured to process data to make predictions and/or inferences. ML algorithms build models using sample data (referred to as "training data") and/or based on past experience in order to make predictions or decisions without being explicitly programmed to do so.

ML model design is a lengthy process that involves a highly iterative cycle of training and validation to tune the structure, parameters, and/or hyperparameters of a given ML model. The training and validation can be especially time consuming and resource intensive for larger ML architectures such as deep neural networks (DNNs) and the like. Conventional ML design techniques may also require relatively large amounts of computational resources beyond the reach of many users.

The efficiency of an ML model, in terms of resource consumption, speed, accuracy, and other performance metrics, are based in part on the number and type of model parameters and/or hyperparameters used for the ML model. Changes to model parameters and/or hyperparameters can greatly impact the performance of a given ML model. In particular, reducing the number of parameters may decrease the accuracy of a model, but may allow the model to run faster and use less memory than it would with a larger number of parameters.

Instead of manually designing an ML model, Neural Architecture Search (NAS) algorithms can be used to automatically discover an ideal ML model for a particular task (see e.g., Abdelfattah et al., "Zero-Cost Proxies for Lightweight NAS." ArXiv abs/2101.08134 (20 Jan. 2021) ("[Abdelfattah]"), Liu et al., "DARTS: Differentiable Architecture Search", arXiv:1806.09055v2 [cs.LG] (23 Apr. 2019) ("[Liu]"), Cai et al., Once-for-All: Train One Network and Specialize it for Efficient Deployment", arXiv: 1908.09791v5 [cs.LG] (29 Apr. 2020) ("[Cai1]"), and Cai et al., "ProxylessNAS: Direct Neural Architecture Search on Target Task and Hardware", arXiv:1812.00332v2 [cs.LG] (23 Feb. 2019) ("[Cai2]")). NAS is a process of automating architecture engineering. However, NAS can also be time consuming and computationally intensive; typically using NAS can take many hours or days to fully train a single neural network (see [Abdelfattah]). Another solution involves training a SuperTransformer to perform evolutionary searches (see e.g., Wang et al., "HAT: Hardware-Aware Transformers for Efficient Natural Language Processing", arXiv:2005.14187v1 [cs.CL] (28 May 2020) ("[Wang]")). However, this solution suffers from the same deficiencies as the NAS-based solutions.

One method that attempts to reduce the time needed for performing NAS includes using a proxy training regime ("proxies"). Proxies can be used to predict a model's accuracy instead of full training (see [Abdelfattah]). This involves using a proxy function to produce a proxy score that gives a rough approximation of a model's performance. However, proxy functions do not always correlate well to the metric they are approximating (see e.g., Mellor et al., "Neural Architecture Search without Training", Int'l Conference on Machine Learning, PMLR, pp. 7588-7598 (1 Jul. 2021) ("[Mellor]")), which is why proxy function are still an active area of research. Furthermore, models optimized on proxy tasks are not guaranteed to be optimal on the target task, especially when taking hardware metrics such as latency into consideration (see [Cai2]).

Another deficiency of the existing solutions is their limited applicability. For example, the solutions described in [Cai1] and [Cai2] are used solely for image recognition, and the solutions described in [Wang] is limited to language translation. These solutions do not provide a comprehensive system of finding optimal ML architectures for multiple, different AI/ML domains.

In addition to only being applicable to a limited set of problem domains, existing solutions perform ML model searches on a very narrow set of performance metrics. For example, [Cai1] only provide results for top-1 accuracy and latency. In [Wang], the results are only provided in terms of bilingual evaluation understudy (BLEU) score, latency, and model size (i.e., number of parameters). These solutions are restricted to a small subset of performance metrics, which may or may not be relevant to specific users.

Finally, existing solutions have devoted most of their effort towards decreasing the amount of time needed to train a super network (supernet), which is a pre-trained, over-parameterized network from which smaller sub-networks (subnets) can be derived. While the existing solutions may be successful in this regard, they have neglected to spend much time finding ways to decrease the amount of time finding optimal DNN architectures from a supernet. Instead, the existing solutions tend to use simple, off-the-shelf methods (e.g., random search, genetic algorithms, Bayesian optimization, Tree-structured Parzen estimators, etc.) for this step of their solutions.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
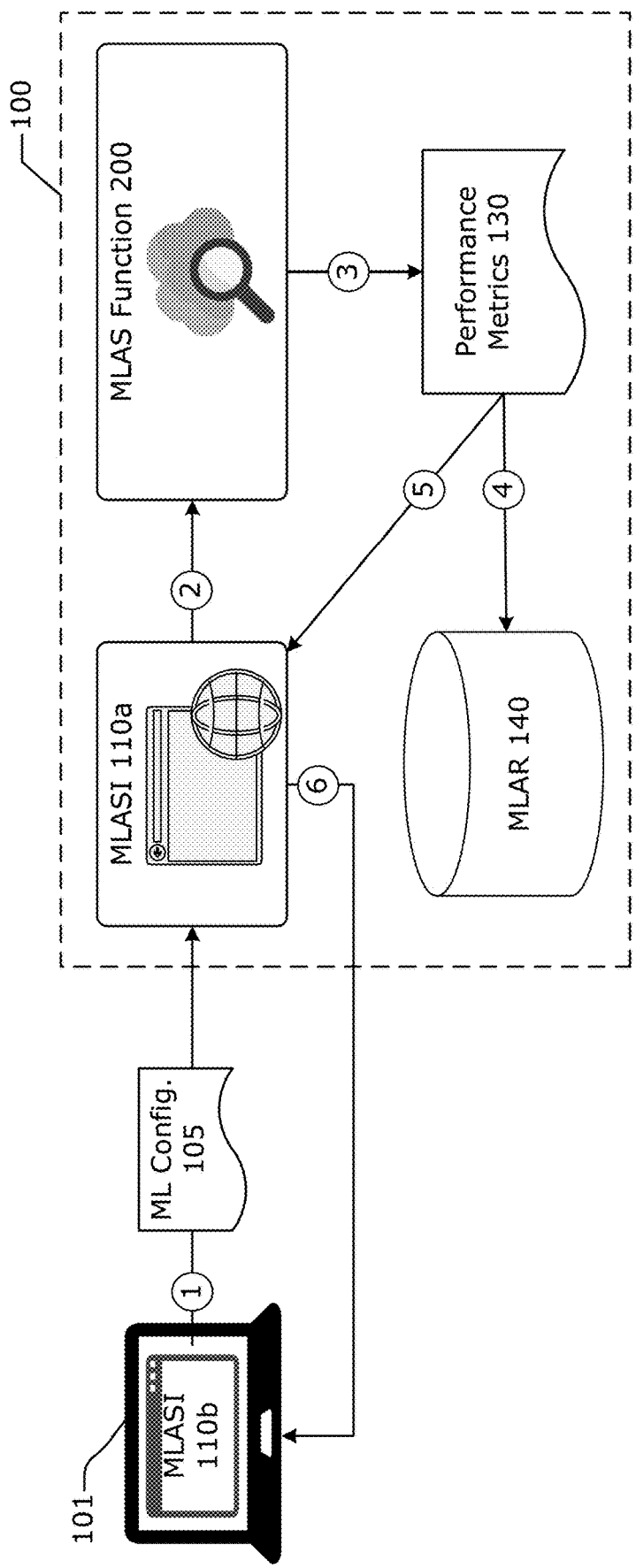
FIG. 1 depicts an overview of a machine learning (ML) architecture search system according to various embodiments.

The present disclosure is related to techniques for optimizing artificial intelligence (AI) and/or machine learning (ML) models to reduce resource consumption while improving AI/ML model performance. In particular, the present disclosure provides a comprehensive framework for co-optimization of ML models (e.g., deep neural networks (DNNs)) and hardware.

AI/ML researchers are continually pushing the state-of-the-art by creating new ML models and algorithms (e.g., including DNNs) for different application domains (e.g., computer vision, language translation, etc.). In many cases, the ML models are created and evaluated on the hardware platform available to the researcher at the time (e.g., a desktop computer with a standard consumer-based platform and/or a graphics processing unit (GPU)). Furthermore, researchers may only consider a narrow set of performance metrics (e.g., accuracy) when evaluating the ML model. Therefore, the ML model is inherently optimized for the hardware platform available to the researcher at the time of researching and the particular metrics researched. Users trying to solve the same problem for which the ML model was designed may only have access to different hardware platforms than those used by AI/ML researchers, or may have a particular hardware platform in mind for deployment of a particular ML model. Furthermore, some users may be interested in different and/or multiple performance metrics (e.g., accuracy, latency, power consumption, etc.). The performance of the ML model provided by the researcher is then suboptimal for these users.

However, optimizing an ML model for individual hardware platforms and specific performance metrics is a very time-consuming effort, which requires highly specialized knowledge. This type of optimization is typically done manually with a great deal of in-depth understanding of the hardware platform since certain characteristics of the hardware platform (e.g., clock speed, number of processor cores, amount of cache memory, etc.) will affect the optimization process. The optimization process is also affected by the characteristics of the input data to the ML model (e.g., batch size, image size, number of epochs/iterations, etc.). Finally, any change to the performance metrics (e.g., going from latency to power consumption), input data characteristics (e.g., increasing the batch size), hardware characteristics (e.g., increasing the number of processor cores) or hardware platform (e.g., going from a GPU to central processing unit (CPU)) would require starting this expensive optimization process again.

The present disclosure provides an ML architecture search system that discovers ML architectures that are applicable to specified AI/ML application domains and are optimized for specified hardware platforms in significantly less time than could be done manually, and using significantly less computation resources than existing approaches. Furthermore, if a hardware platform (or different components) change and/or if relevant metric(s) change, these changes can be easily used to discover new/different ML architectures that are optimal for the new/updated specifications.

Figure 4:
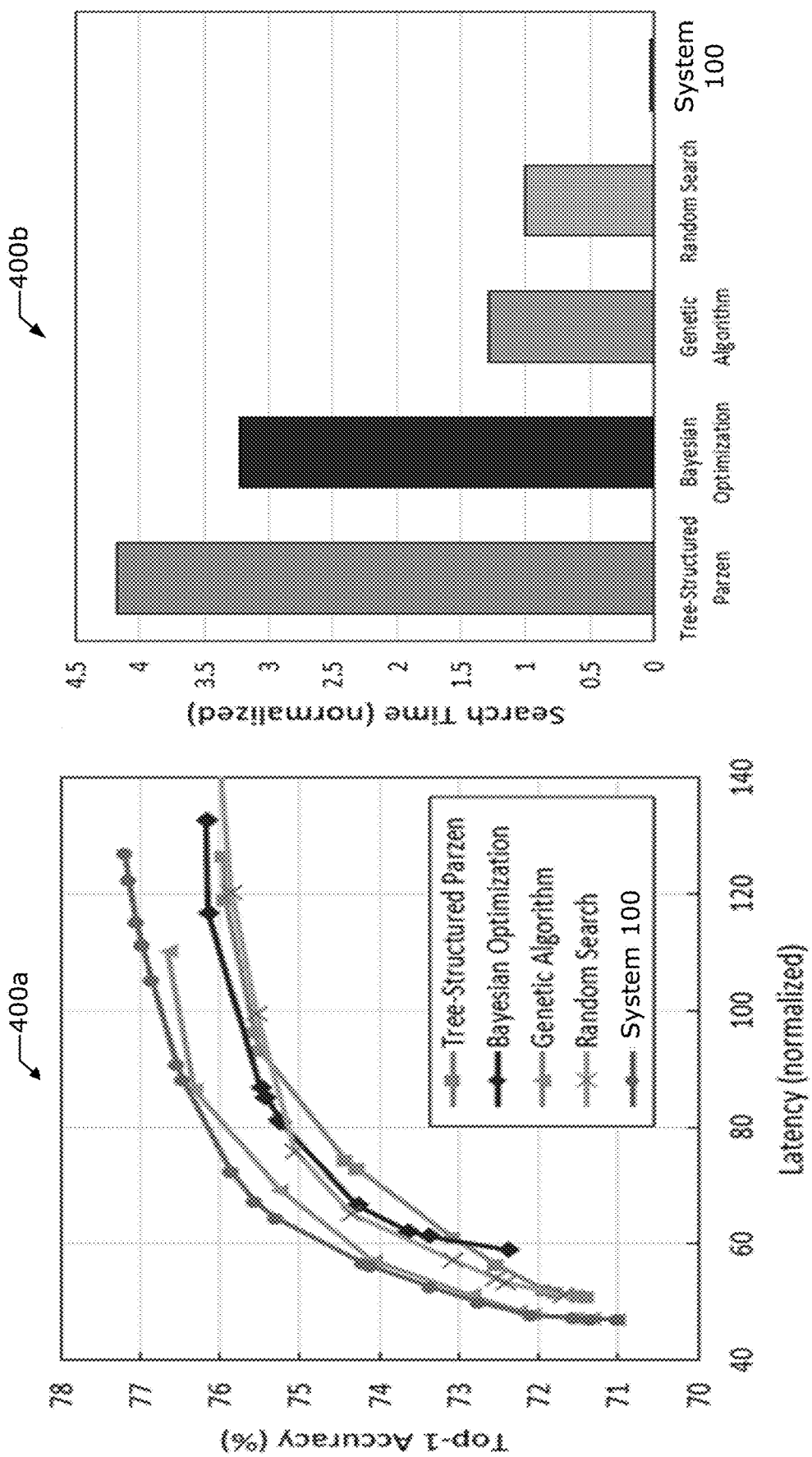
FIG. 4 depicts search results using the ML architecture search according to various embodiments compared with existing solutions.

While the quality of the ML architectures found using existing solutions varies, the embodiments discussed herein use an approach that is well suited to optimizing for multiple metrics at once and improves the search such that very high-performance ML architectures are found in significantly less time than other approaches (see e.g., FIG. 4). To decrease the time needed to discover optimal ML architectures, the ML architecture search system discussed infra determines ML architecture-specific parameters that are most relevant for the specified hardware platform and specified performance metrics.

In contrast to the existing solutions, which use a piecemeal approach to solving problems, the ML architecture search system discussed infra can be applied to a wide variety of AI/ML tasks, AI/ML domains, and/or performance metrics. The ML architecture search system discussed infra allows for the specification of a variety of AI/ML tasks and/or domains and performance metrics (e.g., in the form of an ML configuration), and automatically discovers an optimal ML architecture for those specifications (or ML configuration). The ML architecture search system discussed infra not only discovers more optimal ML architectures than existing approaches, the ML architecture search system discussed infra also discovers these ML architectures in a shorter amount of time than the existing approaches.

1. Machine Learning (ML) Architecture Search Framework

FIG. 1 shows the main components and interactions of an ML architecture search (MLAS) system 100. MLAS system 100 provides a holistic and comprehensive framework for automatically and efficiently finding ML architectures, which are optimized to one or more specified performance metrics and/or hardware platforms. The MLAS system 100 is applicable to multiple AI/ML domains (e.g., image recognition, semantic segmentation, language translation, language modeling, recommendation) and allows for intuitive specification of the AI/ML task(s) and/or domain(s) for which a user wants optimized ML architectures. The MLAS system 100 includes an MLAS interface (MLASI) 110a, an MLAS function 200, performance metrics 130, and an ML architecture repository (MLAR) 140. Operation of the system 100 may be as follows.

At step 1, a client device 101 provides an ML configuration (config) 105 to the MLASI 110a. In FIG. 1, the client device 101 is shown as a laptop computer, however, the client device 101 may be any other type of client or user device such as those discussed herein. To interact with the MLASI 110a, the client device 101 operates an MLASI client application (app) 110b (hereinafter referred to as "MLASI 110b"), which may be a suitable client such as web browser, a desktop app, mobile app, a web app, and/or other like element that is configured to operate with the MLASI 110a via a suitable communication protocol (e.g., hypertext transfer protocol (HTTP) (or variants thereof), Message Queue Telemetry Transport (MATT), Real Time Streaming Protocol (RTSP), and/or the like). The MLASI 110a allows a user of the client device 101 to manage (or specify) how the MLAS system 100 is to search for an optimal ML architecture.

For purposes of the present disclosure, the term "ML architecture" may refer to a particular ML model having a particular set of ML parameters and/or such an ML model configured to be operated on a particular hardware platform. Here, the set of ML parameters may refer to "model parameters" (also referred to simply as "parameters") and/or "hyperparameters." Model parameters are parameters derived via training, whereas hyperparameters are parameters whose values are used to control aspects of the learning process and usually have to be set before running an ML model. Additionally, for purposes of the present disclosure, hyperparameters may be classified as architectural hyperparameters or training hyperparameters. Architectural hyperparameters are hyperparameters that are related to architectural aspects of an ML model such as, for example, the number of layers in a DNN, specific layer types in a DNN (e.g., convolutional layers, multilayer perception (MLP) layers, etc.), number of output channels, kernel size, and/or the like. Training hyperparameters are hyperparameters that control an ML model's training process such as, for example, number of epochs, learning rate, and the like. For purposes of the present disclosure, the term "ML parameter" as used herein may refer to model parameters, hyperparameters, or both model parameters and hyperparameters unless the context dictates otherwise.

Figure 3:
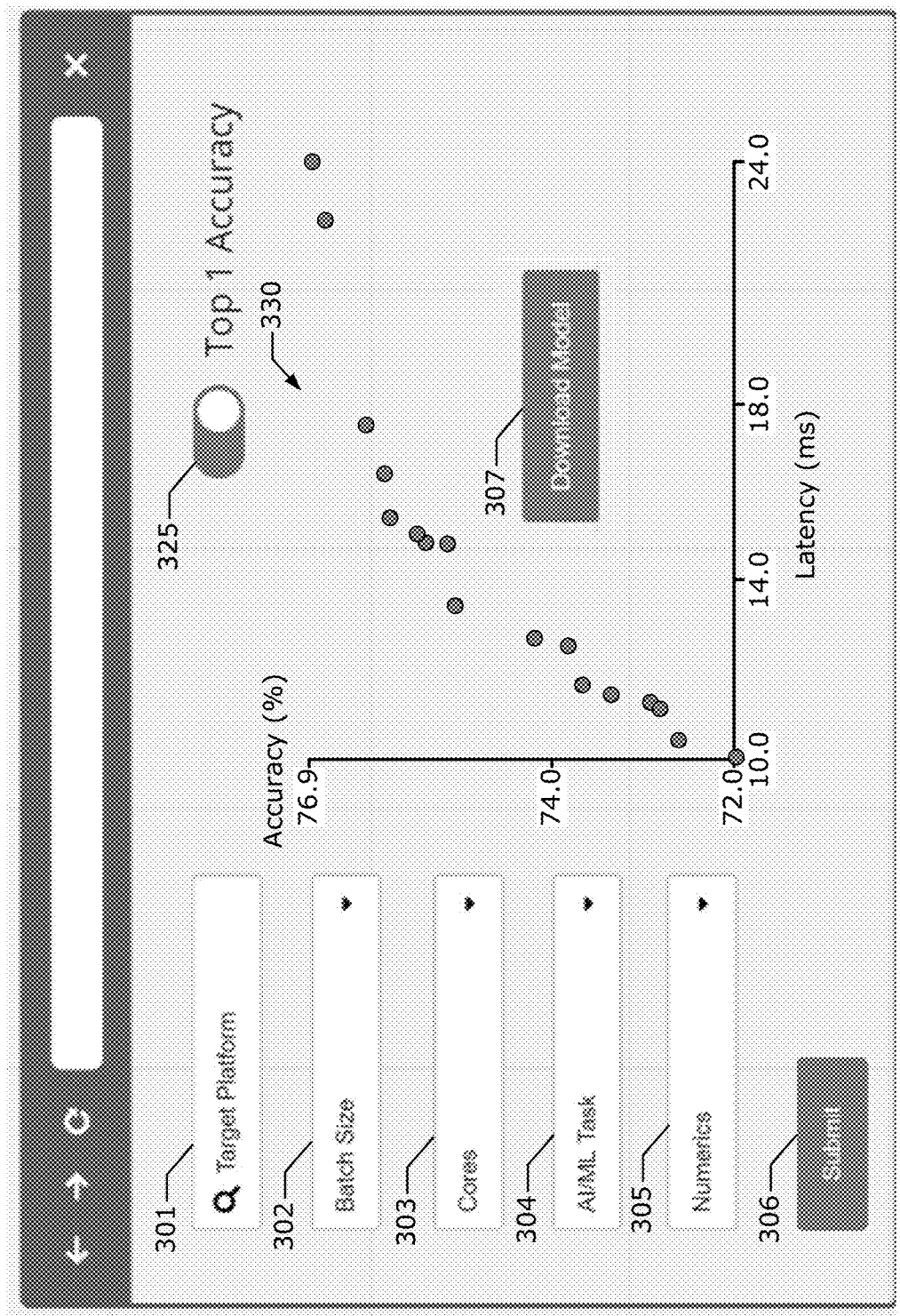
FIG. 3 depicts an example machine learning (ML) architecture search user interface according to various embodiments.

The MLASI 110a is a server-side app or the like that allows a user to provide inputs 105 to the system 100 using their MLASI 110b. For example, the MLASI 110a and MLASI 110b (collectively referred to as "MLASI 110") provides a platform or framework that allows ML model designers, developers, and/or other types of users to create, edit, and/or manipulate ML models and/or ML applications. The MLASI 110 comprises a graphical user interface (GUI) including various graphical elements/objects that allow users to add, update, and/or change various ML architecture search parameters and/or (pre-trained) supernet, and/or other like ML model aspects. The MLASI 110 also allows the user of the client device 101 to obtain (e.g., download) an optimal ML architecture/model discovered by the MLAS system 100. An example of such a GUI is shown in FIG. 3. In some implementations, the MLASI 110b may be a command line interface and/or a development environment that is the same or similar to a software development environment (SDE), an integrated development environment (IDE), a software development kit (SDK), a software development platform (SDP), etc., that are used for app development. Additionally, the MLASI 110a includes application programming interfaces (APIs) to access the other subsystems of system 100, manages the ML model and parameter updates (e.g., new or updated ML config. 105), and calls the supported ML operations library (e.g., as indicated by the ML config. 105). Furthermore, the ML config. 105 may be an information object, file, electronic document, etc., in any suitable form or format such as, for example, a suitable mark-up language document (e.g., HyperText Markup Language (HTML), Extensible Markup Language (XML), AI Markup Language (AIML), JavaScript Object Notation (JSON), etc.), a columnar file format (e.g., Hierarchical Data Format (HDF) including HDF4, HDF5, etc.; Hadoop distributed file system (HDFS); Apache® Parquet, petastorm; etc.), tabular text-based format (e.g. comma separated values (csv), spreadsheet file formats (e.g., .xlsx, etc.)), model file formats (e.g., protocol buffer files (.pb file extension), Keras (.h5 file extension), python (.pkl file extension), PyTorch models (.pt file extension), predictive model markup language (.pmml file extension), the .mlmodel file format, etc.), and/or the like.

The ML config. 105 at least includes a set of search parameters. The set of search parameters include values, variables, objects, data, or other information including or indicating a desired one or more of AI/ML task(s), AI/ML domain, multi-metric starting point and/or region of interest (ROI), suitable dataset(s), supported libraries (e.g., PyTorch, TensorFlow, Apache™ MXNet, etc.), hardware platform information (HPI), performance metrics (e.g., latency, accuracy, power consumption, etc.), ML parameters, and/or other like search parameters, information, and/or data such as a multi-metric starting point and/or ROI from which to start the ML model search. The set of search parameters may be in the form of a search query string, markup language document, and/or any other suitable form/format.

The AI/ML tasks may describe a desired problem to be solved and the AI/ML domain may describe a desired goal to be achieved. Examples of ML tasks include clustering, classification, regression, anomaly detection, data cleaning, automated ML (autoML), association rules learning, reinforcement learning, structured prediction, feature engineering, feature learning, online learning, supervised learning, semi-supervised learning (SSL), unsupervised learning, machine learned ranking (MLR), grammar induction, and/or the like. ML domains include, reasoning and problem solving, knowledge representation and/or ontology, automated planning, natural language processing (NLP), perception (e.g., computer vision, speech recognition, etc.), autonomous motion and manipulation (e.g., localization, robotic movement/travel, autonomous driving, etc.), and social intelligence.

Additionally or alternatively, a relatively large reference ML model (referred to herein as a "super-network" or "supernet") may be provided instead of, with, or in the ML config. 105 from which the system 100 is to discover a smaller ML model (referred to herein as a "sub-network" or "subnet").

In these implementations, the MLASI 110 may include a suitable file transfer mechanism or upload component to enable the client device 101 to supply the supernet (or the ML config. 105) to the system 100. Additionally or alternatively, the supernet contains an over-parameterized set of operations from which one or more subnets are selected during generation of optimal ML architectures. As an example, a supernet may be a relatively large and/or dense ML model that an end-user has developed, but is expensive to operate in terms of computation, storage, and/or power consumption. This supernet may include parameters and/or weights that do not significantly contribute to the prediction and/or inference determination, and these parameters and/or weights contribute to the supernet's overall computational complexity and density. Therefore, the supernet contains a smaller subnet that, when trained in isolation, can match the accuracy of the original ML model (supernet) when trained for the same number of iterations or epochs. In some implementations, the user-supplied supernet may be pre-trained, or the system 100 may train the supernet.

The ML config. 105 can also include an appropriately formatted dataset (or a reference to such a dataset). Here, an appropriately formatted dataset refers to a dataset that corresponds to the provided supernet, and/or the specified AI/ML task and/or AI/ML domain. For example, a dataset that would be used for the NLP domain would likely be different than a dataset used for the computer vision domain.

As mentioned previously, the ML config. 105 may include HPI. The HPI may include configuration, specifications, technical details, characteristics, and/or other aspects of a desired hardware platform and/or individual hardware components on which the user intends to deploy an ML model. In some implementations, the ML config. 105 may include a particular identifier (ID) or information for a specific hardware platform (e.g., system model, brand or product line, model number, generation or version number, stock keeping unit (SKU), product line suffix, serial number, device ID, device name, product ID, etc.), which would then be used to obtain relevant information of that platform for the ML architecture search. In one example of these implementations, the ML config. 105 may specify a desired system or device such as "Dell® PowerEdge® R750 Rack Server", "Intel® Quark™ SE microcontroller C1000 platform", "Mobotix® M73", "Samsung® Galaxy® S21 Ultra 5G", or the like. Additionally or alternatively, the user can input or otherwise indicate a specific cloud computing platform/service (and optionally, available resources based on their cloud service subscription, account details, etc.) such as, for example, by specifying Google Cloud® Vertex AI, Amazon® SageMaker™, Microsoft® Azure Machine Learning, and/or the like.

Additionally or alternatively, similar IDs/information may be provided for individual hardware components (e.g., processor(s), memory devices, chipset, sensor types, etc.) such as, for example, an ID/information for a specific processor, individual memory devices, individual storage devices, motherboard, baseboard, I/O devices, network card, etc. Additionally or alternatively, the ML config. 105 may include specifications of different hardware devices or platforms such as, for example, processor specifications (e.g., number of cores or threads, clock frequency or clock rate (e.g., base clock rate and/or boosted clock rate), cache size, bus speed, memory bandwidth, thermal design power (TDP), etc.), memory device specifications (e.g., capacity, cell type, stick type, clock frequency, etc.), storage device specifications (e.g., read/write speeds, input/output operations per second (IOPS), storage capacity, memory cell type, etc.), and/or other like specifications such as lithography or semiconductor technology used to manufacture an integrated circuit, and/or the like.

At step 2, the MLASI 110a provides the ML config. 105 (e.g., search parameters and/or supernet) to the MLAS function 200. The MLAS function 200 is an engine, module, or other like collection of elements used to generate optimal ML architectures. The generation of these architectures is determined by the specified ML config. 105, for example, the pre-trained supernet and values from the search parameters. The MLAS function 200 uses the ML config. 105 to generate performance metrics 130, and also provides the performance metrics 130 to the client device 101 via the MLASI 110. The MLAS function 200 determines which ML-specific parameters are most relevant for the specified hardware platform and performance metrics, and employs this information to decrease the size of the ML model search space.

In one example, the ML config. 105 includes a pre-trained supernet (e.g., DNN) that was designed using a high-end hardware platform (e.g., an Intel® Xeon® Platinum 8362 Processor with a 2.80 gigahertz (GHz) base frequency, 48 megabytes (MB) of cache, and 265 Watts (W) TDP), and the user wishes to deploy this supernet on a low-end device such as an IoT device or embedded device (e.g., an Intel Atom® x6413E Processor with a 1.5 GHz base frequency, 1.5 MB of cache, and 9 W TDP) or a System on Chip (SoC) (e.g., Intel® Agilex™ F-Series 027 FPGA (R25A) with 259 megabits (Mb) of embedded memory and a Quad-core 64 bit Arm* Cortex*-A53 having 1.3 to 2.6 GHz base frequency, and 0.25 to 2 MB of cache). Here, the supernet may provide relatively accurate predictions when run on the high-end hardware platform, but may not provide be able to perform as well when operated on the low-end device. This is based in part on the search space and/or parameters that the supernet will utilize will be different depending on the particular platform on which it is deployed. In this example, the MLAS function 200 will generate a subnet from the supernet that can be operated by the low-end device while still performing as well as the supernet to a certain degree (e.g., within some margin of error and/or within some range of performance that is close to the performance metrics of the supernet).

Figure 2:
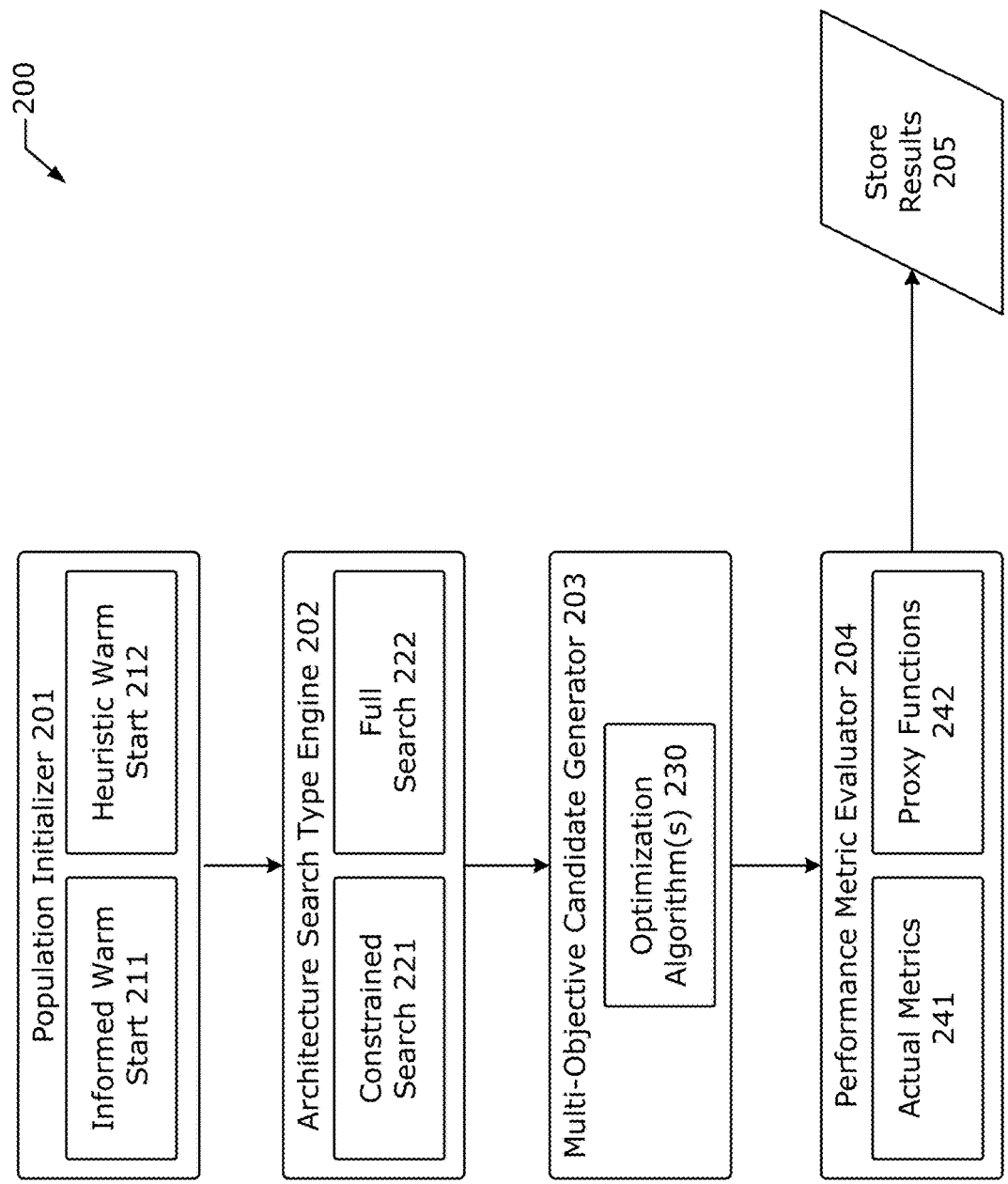
FIG. 2 depicts additional aspects of the ML architecture search system according to various embodiments.

In some implementations, the MLAS function 200 generates or determines a near-optimal starting point, or a set of starting points, for ML architecture search (e.g., the informed warm start 211 discussed infra with respect to FIG. 2) to decrease the amount of time to find optimal ML architectures. Additionally or alternatively, the MLAS function 200 may use a multi-metric starting point or ROI (e.g., the heuristic warm start 212 discussed infra with respect to FIG. 2) as the (or instead of) the near-optimal starting point. The near-optimal starting point, multi-metric starting point, or ROI may be user-specified in some implementations. The near-optimal starting point, multi-metric starting point, or ROI may be used with an enhanced evolutionary algorithm search algorithm (e.g., the enhanced NSGA-II discussed infra with respect to FIG. 2) implemented by the MLAS function 200.

Additionally or alternatively, the MLAS function 200 employs the enhanced evolutionary algorithm search using diversity preservation (see e.g., Igel et al., "Covariance Matrix Adaptation for Multi-objective Optimization", Evolutionary Computation, vol. 15, no. 1, pp. 1-28 (1 Mar. 2007) ("[Igel]") and Deb et al., "A Fast and Elitist Multiobjective Genetic Algorithm: NSGA-II", IEEE Transactions on Evolutionary Computation, vol. 6, no. 2, (April 2002) ("[Deb]"), the contents of each of which are hereby incorporated by reference in their entireties). Additionally or alternatively, the MLAS function 200 employs the enhanced evolutionary algorithm search using non-functional architecture avoidance (see e.g., Stanley et al., "Evolving Neural Networks Through Augmented Topologies", Evolutionary Computation, vol. 10, no. 2, pp. 99-127 (10 Jun. 2002) ("[Stanley]"), the contents of which is hereby incorporated by reference in its entirety). Additional aspects of the MLAS function 200 are discussed infra with respect to FIG. 2.

At step 3, the performance metrics 130 are produced by the MLAS function 200, which are provided to the client device 101 via the MLASI 110 (steps 5 and 6) and stored in a suitable datastore such as MLAR 140 (step 4). An example of the performance metrics 130 displayed by the MLASI 110b is shown in FIG. 3. The performance metrics 130 include some form of measurement(s) of performance of the generated/discovered ML models/architectures. At least in some embodiments, the performance metrics 130 may be referred to as performance indicators, key performance indicators (KPIs), and/or the like. Examples of the performance metrics 130 are discussed infra in section 1.1.

In some implementations, the performance metrics 130 may indicate be in the form of Pareto front (or Pareto frontier) that includes a set of ML architectures that are Pareto efficient solutions. Pareto efficiency refers to a situation where no individual or preference criterion can be better off without making at least one individual or preference criterion worse off or without any loss thereof. Here, an ML architecture may be considered to be Pareto optimal if there is no alternative allocation, configuration, or arrangement of the ML architecture (e.g., ML parameters, model (e.g., DNN layer) configuration/arrangement, hardware configuration, etc.) where performance improvements can be made to at least one aspect of the ML architecture without reducing performance of another aspect of the ML architecture. This Pareto optimality may be presented as a Pareto frontier (also referred to as a "Pareto front" or "Pareto set"), which is the set of all Pareto efficient solutions/allocations. The Pareto front may be shown graphically (see e.g., Pareto frontier 330 of FIG. 3).

The MLAR 140 stores the ML architectures and learned parameter values (e.g., weights) of the optimal ML architectures chosen for download via the MLASI 110b. Additionally or alternatively, the MLAR 140 stores other aspects related to the optimal ML architectures such as, for example, various parameters of the optimal ML architectures; search criteria used to discover the optimal ML architectures (e.g., specified AI/ML task, AI/ML domain, HPI, etc.); heuristics, constraints, and/or other relationships between the parameters of the optimal ML architectures; and/or other like data related to the optimal ML architectures. The MLAR 140 may be a suitable data storage device, database (DB) system and/or a cloud computing service comprising a network or other interconnection of computing systems (e.g., servers, storage devices, applications, etc., such as those discussed herein) that provides access to a pool of physical and/or virtual resources. The MLAR 140 may implement any suitable data storage system/structure such as, for example, a relational DB management system (DBMS), such as non-relational DBMS (e.g., NoSQL DB), and/or some other suitable storage system/structure.

FIG. 2 shows components of the MLAS function 200 according to various embodiments. In some implementations, the MLAS function 200 is based on a multiobjective evolutionary algorithm (MOEA). Evolutionary algorithms (EAs) are population-based metaheuristic optimization algorithms that are inspired by biological evolution. Generally, EAs includes a population of candidate solutions to an optimization problem, which are evolved toward better solutions. Each candidate solution has a set of properties (e.g., its "chromosomes" or "genotype") which can be mutated and altered. In some cases, candidate solutions are represented in binary as strings of 0s and 1s, but other encodings are also possible. Additionally, one run of an EA may produce a set of Pareto optimal solutions to a multi-objective optimization problem. MOEAs are EAs that are applied to multiobjective optimization problems, which involve multiple optimization problems and/or multiple objective functions (including many-objective functions) to be optimized simultaneously (see e.g., Huang et al., "Survey on Multi-Objective Evolutionary Algorithms", IOP Conf. Series: J. of Physics: Conf. Series, vol. 1288, No. 1, p. 012057 (1 Aug. 2019), the contents of which are hereby incorporated by reference in its entirety). The MLAS function 200 includes a population initializer 201, an architecture search type engine 202, a multi-objective candidate generator (MOCG) 203, and a performance metric evaluator 204. The elements of the MLAS function 200 may operate as follows.

The population initializer 201 initializes a population of candidate ML architectures as candidate solutions to the MOEA. The population of candidate ML architectures may be in the form of a suitable data structure, for example, where each candidate ML architecture is represented as a vector, matrix, or tensor of various ML parameters. Each candidate ML architecture plays the role of an individual in a population that is/are evolved iteratively, and the population in each iteration is referred to as a "generation." This is discussed in more detail infra. In various embodiments, the population of candidate ML architectures initialized by the population initializer 201 may be based on the ML parameters indicated by the ML config. 101. For example, the population of candidate ML architectures may include ML architectures that are known to be used for solving a particular AI/ML task and/or the like. Additionally or alternatively, the population of candidate ML architectures may be based on the HPI indicated by the ML config. 101.

In various embodiments, the population initializer 201 uses a warm start mechanism 211, 212 to initialize a population or search space. The warm start mechanism 211, 212 stores and analyzes the characteristics of ML architectures that were found to be optimal in past searches to infer near-optimal candidates for a current search. The warm start mechanism 211, 212 has been shown to significantly decrease the time needed to find optimal ML architectures. The warm start mechanisms 211, 212 include informed warm start 211 and heuristic warm start 212, one or both of which may be used by the population initializer 201.

For informed warm start 211, the initial population of candidate ML architectures is generated using the information from one or more previous optimal ML architectures. The previous optimal ML architectures may be previously discovered ML architectures that were determined to solve a same or similar AI/ML task, are within a same or similar AI/ML domain, and/or are associated with the same or similar HPI (e.g., were deployable on a same or similar hardware platform). The MLAR 140 stores the previous ML architectures and/or the analyzed characteristics of previous ML architectures that were found to be optimal for past specified search parameters to infer near-optimal candidates for the current population of search parameters (e.g., ML config. 105). For example, if a first ML architecture search was related to an image classification problem to be performed on an Intel® Xeon Skylake processor, and that search yielded information on architectural parameters (e.g., kernel size, number of layers, number of output channels, etc.) were important for generating a subnetwork for that platform. Then, for a second ML architecture search for an image classification problem to be performed on an Intel® Xeon Cascade Lake processor may utilize the architectural parameters as the initial population for the second ML architecture search. This technique has been found to significantly decrease the number of iterations needed to find optimal ML architectures.

For heuristic warm start 212, the initial population of candidate ML architectures are generated using a population of heuristics. The heuristics are strategies derived from previous experiences with similar problems, namely experiences of discovering and/or generating subnets from respective supernets in a particular AI/ML domain, solving a particular AI/ML task, and/or operating on a particular hardware platform. A suitable heuristic function and/or hyper-heuristic function may be used to identify or determine the population of heuristics used for the heuristic warm start 212. Heuristic functions (or simply a "heuristic") are functions that rank alternatives in search algorithms at each branching step based on available information to decide which branch to follow. Hyper-heuristics include search methods that seek to automate the process of selecting, combining, generating, and/or adapting several simpler heuristics (or components of such heuristics) to efficiently solve computational search problems, often by the incorporation of other ML techniques. These heuristics and/or constraints provide a smaller space of ML architectures from which the initial population is sampled. One type of constraint may include dependencies between the various architectural parameters. For example, a first ML architecture search may indicate that an increase in the number of layers cannot be achieved without also increasing the number of output channels for a particular subnet architecture, which may be stored in the MLAR 140. Since this constraint is known prior to a second ML architecture search for a same or similar AI/ML task/domain, these two parameters can be tied together (or otherwise associated with one another) such that an increase in one parameter increases the other parameter (i.e., these parameters may be constrained through a heuristic). This means that a search does not have to be performed over each of these parameters independent of the other, which reduces the total number of ML parameters to search over.

The architecture search type engine 202 determines a type of search (or search strategy) to be used to find the optimal ML architectures from the initial set (population) of candidate ML architectures. The search type or search strategy is a manner in which a search space (i.e., the population provided by the population initializer 201) is to be searched or otherwise analyzed. The search space may be a domain of a function to be optimized and/or a feasible region defining a set of all possible solutions. In embodiments, the search types that are supported include constrained search 221 and full search 222. However, one or more other search types may be used in addition to, or alternative to, the constrained search 221 or the full search 222.

The constrained search 221 (also referred to as "heuristic search 221") is a search type that makes use of constraints, heuristics, and/or correlations in the ML model parameters and/or attributes to decrease the number of iterations needed to evaluate candidate ML architectures. The constrained search 221 is similar to the heuristic warm start 212 in that the constraints or heuristics are used to define correlations or other relations between different parameters, and those relations/correlations are used to constrain the search performed in the ML architecture search space (i.e., the set of candidate ML architectures generated by the population initializer 201). Here, the "constraints" may be logical conditions or sets of combinations of conditions that a solution (e.g., a candidate ML architecture) to an optimization problem (e.g., defined by the MOCG 203 discussed infra) must satisfy (see e.g., Tan et al., "EfficientNet: Rethinking Model Scaling for Convolutional Neural Networks", arXiv:1905.11946v5 [cs.LG] (11 Sep. 2020), the contents of which is hereby incorporated by reference in its entirety). Additionally or alternatively, the "constraints" are constraints on the ML architecture itself such as, for example, architectural parameters that can change, how such parameters can change, and/or if such parameters change proportionally to one or more other architectural parameters. This technique is provided as an option to allow for finding optimal ML architectures in less time than the full search 222 technique.

The full search 222 involves performing a thorough search over the full set of attributes of the candidate ML architectures. The full search 222 is a brute force technique where a search is performed on a manually specified set or subset of an search space. In contrast to the constrained search 221, the full search 222 does not treat the parameters as being correlated. The full search 222 approach is expensive in terms of time and computing resource consumption when compared to the other search approaches. The full search 222 technique may find optimal ML architectures (subnets), but will likely require more time when compared to the constrained search 221.

The MOCG 203 generates candidate ML architectures from those generated initially. The MOCG 203 includes one or more optimization algorithms 230 (also referred to as "optimizers 230", "tuning algorithms 230" or "tuners 230") that help generate ML architectures, which should be optimal with respect to the specified performance metrics. In some implementations, the user of the client device 101 may specify in the ML config. 105 one or multiple performance metrics (e.g., accuracy, latency, power consumption) to be used as part of the MOCG 203. Additionally or alternatively, the user may specify in the ML config. 105 a particular optimizer 230 (or set of optimizer 230) to use. Additionally or alternatively, the user may supply their own (e.g., custom-built) optimizer 230 for use in generating candidate ML architectures.

The optimizer(s) 230 optimize ML parameters of each ML architecture in the set of ML architectures. The optimizer(s) 230 may optimize the ML parameters by attempting to solve an objective function. For example, the objective function may be a loss function that the optimizer(s) 230 attempt to minimize (e.g., by converging to a minimum value of the cost function during the training phase). Loss functions express the discrepancy between predictions of the model being trained and the problem instances. The optimizer(s) 230 may find a set of ML parameters that yield an optimal ML architecture that minimizes the loss function on given independent data, and selects a set of model parameters for an ML model. The tenability of an ML model, ML parameters, or interacting ML parameters is a measure of how much performance can be gained from the tuning process. In some implementations, the optimizer(s) 230 use a global optimization algorithm (also referred to as a global search algorithm) that locates one or more extrema of an objective function for an entire search space (e.g., the population of candidate ML architectures). In some embodiments, the optimizer(s) 230 finds multiple extrema (e.g., optimal ML architectures) as a Pareto Frontier. The global optimization algorithm traverses the entire search space (e.g., the population of candidate ML architectures) and gets close to the extrema of the objective function (or finds the exact extrema of the objective function). In these implementations, the optimizer(s) 230 (or global search algorithm) searches for a set of candidate ML architectures within the population that best fit the ML parameters and/or the HPI at least in comparison to other candidate ML architectures in the population.

In some implementations, the optimizer(s) 230 may determine an ML architecture that is non-dominated or Pareto optimal, which may be an ML architecture where none of the ML parameters can be improved in value without degrading one or more other ML parameters.

Several different optimization algorithms 230 may be used such as grid search, random search (see e.g., Bergstra et al., "Random Search for Hyper-Parameter Optimization", J. of Machine Learning Research, vol. 13, no. 2 (1 Feb. 2012) ("[Bergstra1]"), the contents of which is hereby incorporated by reference in its entirety), genetic algorithms (GAs) (see e.g., Eiben et al., "Introduction to evolutionary computing", $2^{nd}$ Ed., Springer, Berlin (2015) ("[Eiben]"), the contents of which is hereby incorporated by reference in its entirety), Bayesian optimization (see e.g., Dewancker et al., "Bayesian Optimization for Machine Learning: A Practical Guidebook", arXiv preprint arXiv:1612.04858 (14 Dec. 2016) and Snoek et al., "Practical Bayesian Optimization of Machine Learning Algorithms", Advances in Neural Information Processing Systems 25 (NIPS 2012) (29 Aug. 2012), the contents of each of which are hereby incorporated by reference in its entirety), tree-structured Parzen estimators (see e.g., Bergstra et al., "Algorithms for Hyper-Parameter Optimization", Advances in Neural Information Processing Systems 24 (NIPS 2011) (2011) ("[Bergstra2]"), the contents of which is hereby incorporated by reference in its entirety), Strength Pareto Evolutionary Algorithm 2 (SPEA-2) (see e.g., Zitzler et al., "SPEA2: Improving the Performance of the Strength Pareto Evolutionary Algorithm," Technical Report 103, Computer Engineering and Communication Networks Lab (TIK), Swiss Federal Institute of Technology (ETH) Zurich, CH, Tik-Report 103 (May 2001), the contents of which is hereby incorporated by reference in its entirety), nondominated sorting genetic algorithm-II (NSGA-II) (see e.g., [Deb]), and/or some other search algorithm. In some implementations, the enhanced EA mentioned previously may be an enhanced version of NSGA-II ("eNSGA-II") may be used for determining ML architectures. Different algorithms will have different tradeoffs such as the quality of the candidates versus the amount of time needed to generate those candidates. In some implementations, the MOCG 203 selects one or more optimizers 230 to be used that best suits the desired hardware platform deployment and/or performance metrics. In either implementation, the subnets can be represented as a vectorized form of an elastic parameters for purposes of optimization.

During operation, in implementations where the optimizer(s) 230 include an EA or GA, in each generation starting from the initial population (201), the fitness of every candidate ML architecture in the population is evaluated (202), where the more fit candidate ML architectures are stochastically selected from the current population (203) and/or the "genome" of individual candidate ML architectures is modified (e.g., recombined and possibly randomly mutated) to form a new generation (203). The new generation of candidate ML architectures is then used in the next iteration of the MOEA (203). The MOEA terminates when either a maximum number of generations has been produced and/or a satisfactory fitness level has been reached for the population.

For eNSGA-II 230, the MOCG 203 starts with a parent population that is representation of different subnets. In one example, 50 subnets may be randomly selected as the parent population from $10^{19}$ possible combinations within an ML architecture search space that is based on the performance metrics: accuracy and latency. Then, a crossover and/or mutation operation is performed on the parent population where two or more parents out of the parent population are combined and/or mutated (see e.g., [Eiben] discussing crossover and mutation operations). The mutation may involve selecting specific elastic parameter slices/sets to randomly mutate based on a predefined probability and/or a number of performance metrics to be optimized. The crossover and/or mutation operations produce a child population, and the eNSGA-II 230 ranks the individuals (e.g., ML architectures) in the child population, where the lowest ranking individuals make up the Pareto optimal front. Non-dominated sorting is then performed on the ranked child population, and a crowding distance sorting mechanism is used to choose a diverse set of individuals in the child population to carry over into a next crossover and/or mutation iteration. In one implementation, the Manhattan distance between each set of two points is calculated thereby creating a bounding box, and points within that bounding box are removed. Additionally or alternatively, the Manhattan distance and crowding distance algorithm discussed in Javadi et al., "Combining Manhattan and Crowding distances in Decision Space for Multimodal Multi-objective Optimization Problems", EUROGEN 2019, (12 Sep. 2019) ("[Javadi]"), which is hereby incorporated by reference in its entirety, can be used to select solutions for proceeding iterations of the eNSGA-II. This process is then repeated until a convergence is reached or some optimal front is obtained. Additionally or alternatively, other distance metrics may be used in other implementations.

The performance metric evaluator 204 evaluates specified performance metrics of the identified ML architectures. The performance metric evaluator 204 may compute actual performance metrics 241 or may use proxy function(s) 242 to approximate the performance metrics. In some implementations, the user may select whether to use actual performance metrics 241 or one or more specific proxy function(s) 242. For the actual performance metrics 241, the performance metric evaluator 204 collects measurements of the performance metrics using actual data. For example, if accuracy was specified as one of the performance metrics, the performance metric evaluator 204 would train or otherwise operate the optimal ML model using a predefined dataset and compute its accuracy. When compared to Proxy Functions, this technique provides exact performance metric measurements but will require more time to complete.

The proxy function(s) 242 include any function that takes one or more variables, ML parameters, data, and/or the like as inputs, and produces an output that is a replacement, substitute, stand-in, surrogate, or representation of the inputs. The proxy functions 242 used by the performance metric evaluator 204 are used to approximate model performance for the optimal ML architecture. Examples of proxy function(s) 242 that may be used include functions and/or data structures that map keys to values (e.g., associative arrays, mapping functions, dictionaries, hash tables, LUTs, linked lists, etc.), ML classifiers, parameter counting, computational throughput metrics, Jacobian covariance, saliency pruning, channel pruning, and heuristic and/or hyper-heuristic functions, and/or some other suitable proxy function or combinations thereof (see e.g., co-pending U.S. application Ser. No. 17/497,736 filed on 8 Oct. 2021, which is hereby incorporated by reference in its entirety). Using proxy function(s) 242 may significantly decrease the amount of time needed to find optimal ML architectures but with the possibility that the performance metric measurements contain a small amount of error. In some implementations, the proxy function(s) 242 may be used to predict the performance metrics of the candidate ML architectures in the search space, and when a Pareto front is determined, the actual performance metrics 241 can be measured for the ML architectures that lie along the Pareto front.

After the performance metric evaluation 204, the optimal ML architectures are stored 205 in the MLAR 140. The optimal ML architecture parameters and their associated performance metric values are stored in the MLAR 140 for later retrieval (e.g., for future searches performed by the user and/or other users operating other client devices 101). The data stored in the MLAR 140 may include the ML architectures themselves, the ML parameters of those ML architectures, their Pareto frontier, ML config. 105 used for the basis of the search, and/or any other suitable information.

1.1. Performance Metrics

The performance metrics that may be measured and/or predicted by the performance metric evaluator 204 may be based on the particular AI/ML task and the other inputs/parameters of the ML config. 105. The performance metrics may include model-based metrics and platform-based metrics. The model-based metrics are metrics related to the performance of the model itself and/or without considering the underlying hardware platform. The platform-based metrics are metrics related to the performance of the underlying hardware platform when operating the ML model.

The model-based metrics may be based on the particular type of AI/ML model and/or the AI/ML domain. For example, regression-related metrics may be predicted for regression-based ML models. Examples of regression-related metrics include error value, mean error, mean absolute error (MAE), mean reciprocal rank (MRR), mean squared error (MSE), root MSE (RMSE), correlation coefficient (R), coefficient of determination ($R^2$), Golbraikh and Tropsha criterion, and/or other like regression-related metrics such as those discussed in Naser et al., "Insights into Performance Fitness and Error Metrics for Machine Learning", arXiv: 2006.00887v1 (17 May 2020) ("[Naser]"), which is hereby incorporated by reference in its entirety.

In another example, correlation-related metrics may be predicted for correlation-related metrics Examples of correlation-related metrics include accuracy, precision (also referred to as positive predictive value (PPV)), mean average precision (mAP), negative predictive value (NPV), recall (also referred to as true positive rate (TPR) or sensitivity), specificity (also referred to as true negative rate (TNR) or selectivity), false positive rate, false negative rate, F score (e.g., $F_1$ score, $F_2$ score, $F_\beta$ score, etc.), Matthews Correlation Coefficient (MCC), markedness, receiver operating characteristic (ROC), area under the ROC curve (AUC), distance score, and/or other like correlation-related metrics such as those discussed in [Naser].

Additional or alternative model-based metrics may also be predicted such as, for example, cumulative gain (CG), discounted CG (DCG), normalized DCG (NDCG), signal-to-noise ratio (SNR), peak SNR (PSNR), structural similarity (S SIM), Intersection over Union (IoU), perplexity, bilingual evaluation understudy (BLEU) score, inception score, Wasserstein metric, Frechet inception distance (FID), string metric, edit distance, Levenshtein distance, Damerau-Levenshtein distance, number of evaluation instances (e.g., iterations, epochs, or episodes), learning rate (e.g., the speed at which the algorithm reaches (converges to) optimal weights), learning rate decay (or weight decay), number and/or type of computations, number and/or type of multiply and accumulates (MACs), number and/or of multiply adds (MAdds) operations and/or other like performance metrics related to the performance of the ML model.

Examples of the platform-based metrics include latency, response time, throughput (e.g., rate of processing work of a processor or platform/system), availability and/or reliability, power consumption (e.g., performance per Watt, etc.), transistor count, execution time (e.g., amount of time to obtain a prediction, inference, etc.), memory footprint, memory utilization, processor utilization, processor time, number of computations, instructions per second (IPS), floating point operations per second (FLOPS), and/or other like performance metrics related to the performance of the ML model and/or the underlying hardware platform to be used to operate the ML model.

Additionally or alternatively, proxy metrics (e.g., a metric or attribute used as a stand-in or substitute for another metric or attribute) can be used for predicting the ML model performance. For any of the aforementioned performance metrics, the total, mean, and/or some other distribution of such metrics may be predicted and/or measured using any suitable data collection and/or measurement mechanism(s).

1.2. Example User Interfaces

FIG. 3 shows an example graphical user interface (GUI) 300 that may be used by a user to perform an ML architecture search according to various embodiments. The GUI 300 may correspond to the MLASI client application (app) 110b of FIG. 1. In this example, the GUI 300 includes various graphical objects 301-306 that enable the user to provide ML parameters to the system 100. The graphical object 301 is a text input box that allows the user to input and search for a particular hardware platform on which they wish to operate the ML architecture. In some implementations, the user may begin typing and the text input box 301 may be auto-populated based on each character that the user types. The graphical objects 302-305 are drop down list elements that allow the user to select predefined ML parameters including a desired batch size 302 (e.g., 16, 32, and so forth), number of processor cores 303 (e.g., which may be dependent on the particular target platform 301 the user selects), a particular AI/ML task 304 (e.g., "classification/ImageNet 2012", and/or the like such as those discussed herein), and number format (numerics) 305 including a particular representation (e.g., fixed-point formatting, "fp32" or "float32", Institute of Electrical and Electronics Engineers (IEEE) 754 floating point representation, an arbitrary-precision representation, and so forth), and/or other like). Although not shown, other graphical objects may be included to specify other hardware parameters (e.g., memory device, etc.), performance metrics, and/or other like ML configuration information/search parameters. The user may then submit the selected ML parameters to the system 100 using the graphical object 306 (e.g., the submit button 306 in FIG. 3). Upon selecting the submit button 306, the MLASI 110b may generate the ML config. 105 and submits it to the system 100.

After the user inputs the various ML parameters, the system 100 finds ML architecture candidates and displays them to the user via the GUI 300 who can then select and download the ML architecture which best fits their needs using the graphical object 307. In this example, the GUI 300 displays a graph 330 indicating the Pareto frontier (referred to as "Pareto frontier 330") of the discovered ML architectures. In this example, the Pareto frontier 330 is represented by the displayed points in the graph 330. Each point in the graph 330 may represent a respective ML model that is downloadable by the user. Here, the user then can click on an individual point in the graph 330, and download the corresponding ML model using the graphical object 307 (e.g., the download model button 307 in FIG. 3).

Additionally, the GUI 300 includes a toggle graphical object 325 (also referred to as "top-1 object 325", "top-1 325", or the like) that allows the user to switch between views of only ML architectures having top-1 accuracy and all discovered/generated ML models. Top-1 accuracy refers to a level of ML model prediction accuracy where a model answer with the highest probability is the expected answer. Top-1 accuracy measures the proportion of examples for which the predicted label matches a single target label. Additionally or alternatively, the GUI 300 may include a GCE for viewing Top-5 accuracy of the ML models, which indicates whether any of an ML model's five highest probability answers match the expected answer. When the user selects the toggle graphical object 325, the number and position of the points in the graph 330 may change.

In one example use case, the system 100 is a tool or service provided by a distributed computing system such as a cloud computing service. These users of this service (e.g., users of client device 101) would use the tool to quickly and automatically find ML architectures which run efficiently on their existing hardware platform, and satisfy accuracy requirements and/or other desired performance metrics, providing them with a great deal of value. In addition, since this tool can easily be applied to Intel-specific hardware platforms, potential customers are provided with an incentive to use Intel hardware. An example user interface for this tool is shown in FIG. 3.

1.3. Simulation Results

FIG. 4 shows graphs 400a and 400b, showing comparisons the system 100 for finding high-performing ML architectures to other solutions. Graph 400a shows a Top-1 accuracy versus normalized latency for the system 100 and other listed solutions, which shows the system 100 having better top-1 accuracy with less latency than the other listed solutions. Graph 400*b* shows a normalized search time of the various listed solutions and system 100, which shows the system 100 having significantly less search time than the other listed solutions. The system 100 not only finds better architectures (lower latency and higher accuracy) than all others (graph 400*a*) but does so in significantly less time (graph 400*b*). Note that the search time (graph 400*b*) is the amount of time needed to find the entire Pareto frontier (graph 400*a*) and is normalized to the random search time. Based on the graphs 400*a* and 400*b*, random search can find ML architectures that have mediocre performance but in a relatively short period of time. Bayesian optimization finds ML architectures that are marginally better than the random search, but requires much more time than random search. The GA approach requires a relatively modest amount of time to find high-performing ML architectures, but GAs can still be significantly improved using the system 100. The algorithmic efficiency of our solution compared to random search is more clearly seen in FIG. 5.

Figure 5:
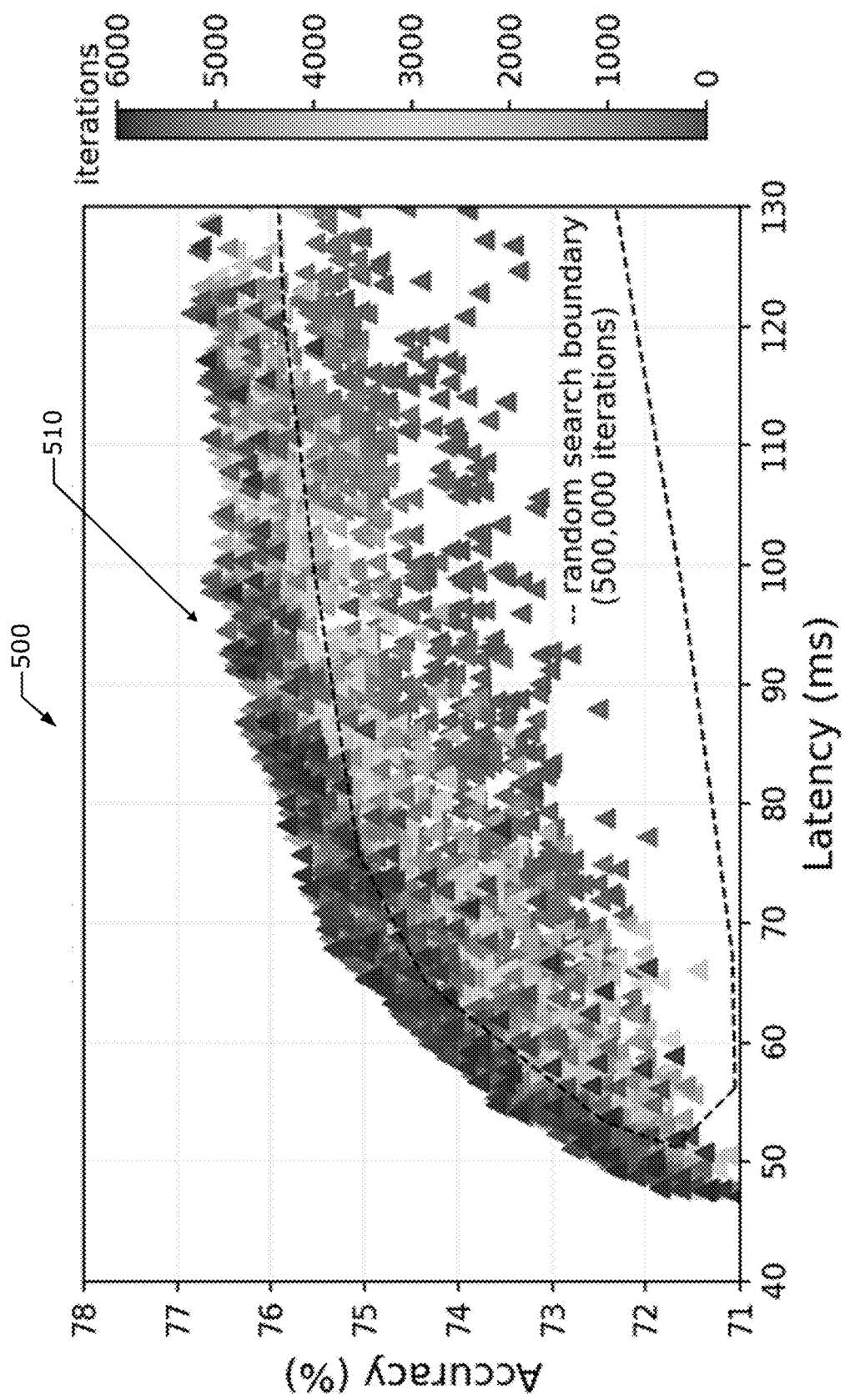
FIG. 5 depicts a comparison of the ML architecture search of the embodiments discussed herein with a random search method.

FIG. 5 shows algorithmic efficiency graph 500 showing a comparison of system 100 for finding high-performing DNN architectures with the random search method. The dashed lines shows the random search results after 500,000 iterations. In graph 500, lighter shaded triangles represent earlier populations, and the darker shaded triangles represent later populations. Graph 500 shows that, as the search progresses using the system 100, better architectures are found in significantly fewer iterations than using random search.

FIG. 5 shows that as the search for optimal ML architectures progresses, the system 100 not only finds higher-performing ML architectures with lower latency and higher accuracy than the random search method, and does so with a significant increase in algorithmic efficiency. More specifically, the system 100 requires approximately 5,000 iterations to find architectures with similar performance to those found by random search after 500,000 iterations. Hence, when compared to the random search method, the system 100 has reduced the number of iterations by approximately two orders of magnitude.

2. Artificial Intelligence and Machine Learning Aspects

Machine learning (ML) involves programming computing systems to optimize a performance criterion using example (training) data and/or past experience. ML refers to the use and development of computer systems that are able to learn and adapt without following explicit instructions, by using algorithms and/or statistical models to analyze and draw inferences from patterns in data. ML involves using algorithms to perform specific task(s) without using explicit instructions to perform the specific task(s), but instead relying on learnt patterns and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions).

ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data.

In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm" refers to different concepts than the term "ML model," these terms may be used interchangeably for the purposes of the present disclosure. Any of the ML techniques discussed herein may be utilized, in whole or in part, and variants and/or combinations thereof, for any of the example embodiments discussed herein.

ML may require, among other things, obtaining and cleaning a dataset, performing feature selection, selecting an ML algorithm, dividing the dataset into training data and testing data, training a model (e.g., using the selected ML algorithm), testing the model, optimizing or tuning the model, and determining metrics for the model. Some of these tasks may be optional or omitted depending on the use case and/or the implementation used.

ML algorithms accept model parameters (or simply "parameters") and/or hyperparameters that can be used to control certain properties of the training process and the resulting model. Model parameters are parameters, values, characteristics, configuration variables, and/or properties that are learnt during training. Model parameters are usually required by a model when making predictions, and their values define the skill of the model on a particular problem. Hyperparameters at least in some embodiments are characteristics, properties, and/or parameters for an ML process that cannot be learnt during a training process. Hyperparameter are usually set before training takes place, and may be used in processes to help estimate model parameters.

ML techniques generally fall into the following main types of learning problem categories: supervised learning, unsupervised learning, and reinforcement learning. Supervised learning involves building models from a set of data that contains both the inputs and the desired outputs. Unsupervised learning is an ML task that aims to learn a function to describe a hidden structure from unlabeled data. Unsupervised learning involves building models from a set of data that contains only inputs and no desired output labels. Reinforcement learning (RL) is a goal-oriented learning technique where an RL agent aims to optimize a long-term objective by interacting with an environment. Some implementations of AI and ML use data and neural networks (NNs) in a way that mimics the working of a biological brain. An example of such an implementation is shown by FIG. 6.

Figure 6:
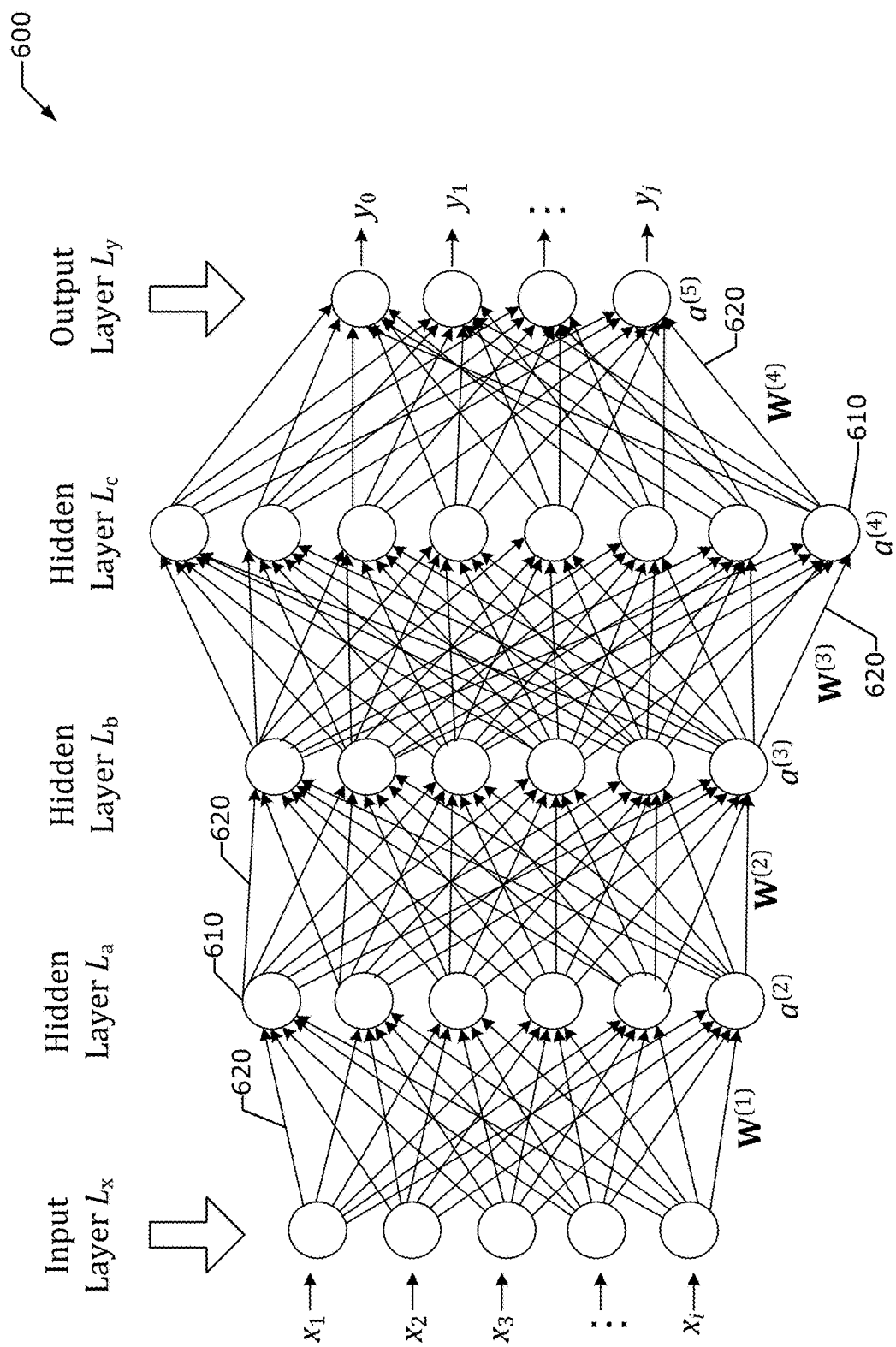
FIG. 6 depicts an example neural network (NN).

FIG. 6 illustrates an example NN 600, which may be suitable for use by one or more of the computing systems (or subsystems) of the various implementations discussed herein, implemented in part by a hardware accelerator, and/or the like. The NN 600 may be deep neural network (DNN) used as an artificial brain of a compute node or network of compute nodes to handle very large and complicated observation spaces. Additionally or alternatively, the NN 600 can be some other type of topology (or combination of topologies), such as a convolution NN (CNN), deep CNN (DCN), recurrent NN (RNN), Long Short Term Memory (LSTM) network, a Deconvolutional NN (DNN), gated recurrent unit (GRU), deep belief NN, a feed forward NN (FFN), a deep FNN (DFF), deep stacking network, Markov chain, perception NN, Bayesian Network (BN) or Bayesian NN (BNN), Dynamic BN (DBN), Linear Dynamical System (LDS), Switching LDS (SLDS), Optical NNs (ONNs), an NN for reinforcement learning (RL) and/or deep RL (DRL), and/or the like. NNs are usually used for supervised learning, but can be used for unsupervised learning and/or RL.

The NN 600 may encompass a variety of ML techniques where a collection of connected artificial neurons 610 that (loosely) model neurons in a biological brain that transmit signals to other neurons/nodes 610. The neurons 610 may also be referred to as nodes 610, processing elements (PEs) 610, or the like. The connections 620 (or edges 620) between the nodes 610 are (loosely) modeled on synapses of a biological brain and convey the signals between nodes 610. Note that not all neurons 610 and edges 620 are labeled in FIG. 6 for the sake of clarity.

Each neuron 610 has one or more inputs and produces an output, which can be sent to one or more other neurons 610 (the inputs and outputs may be referred to as "signals"). Inputs to the neurons 610 of the input layer $L_x$ can be feature values of a sample of external data (e.g., input variables $x_i$). The input variables $x_i$ can be set as a vector containing relevant data (e.g., observations, ML features, etc.). The inputs to hidden units 610 of the hidden layers $L_a$, $L_b$, and $L_c$ may be based on the outputs of other neurons 610. The outputs of the final output neurons 610 of the output layer $L_y$ (e.g., output variables $y_j$) include predictions, inferences, and/or accomplish a desired/configured task. The output variables $y_j$ may be in the form of determinations, inferences, predictions, and/or assessments. Additionally or alternatively, the output variables $y_j$ can be set as a vector containing the relevant data (e.g., determinations, inferences, predictions, assessments, and/or the like).

In the context of ML, an "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features.

Neurons 610 may have a threshold such that a signal is sent only if the aggregate signal crosses that threshold. A node 610 may include an activation function, which defines the output of that node 610 given an input or set of inputs. Additionally or alternatively, a node 610 may include a propagation function that computes the input to a neuron 610 from the outputs of its predecessor neurons 610 and their connections 620 as a weighted sum. A bias term can also be added to the result of the propagation function.

The NN 600 also includes connections 620, some of which provide the output of at least one neuron 610 as an input to at least another neuron 610. Each connection 620 may be assigned a weight that represents its relative importance. The weights may also be adjusted as learning proceeds. The weight increases or decreases the strength of the signal at a connection 620.

The neurons 610 can be aggregated or grouped into one or more layers L where different layers L may perform different transformations on their inputs. In FIG. 6, the NN 600 comprises an input layer $L_x$, one or more hidden layers $L_a$, $L_b$, and $L_c$, and an output layer $L_y$ (where a, b, c, x, and y may be numbers), where each layer L comprises one or more neurons 610. Signals travel from the first layer (e.g., the input layer $L_1$), to the last layer (e.g., the output layer $L_y$), possibly after traversing the hidden layers $L_a$, $L_b$, and kmultiple times. In FIG. 6, the input layer $L_a$ receives data of input variables $x_i$ (where i=1, . . . , p, where p is a number). Hidden layers $L_a$, $L_b$, and $L_c$ processes the inputs $x_i$, and eventually, output layer $L_y$ provides output variables $y_j$ (where j=1, . . . , p', where p' is a number that is the same or different than p). In the example of FIG. 6, for simplicity of illustration, there are only three hidden layers $L_a$, $L_b$, and $L_c$ in the ANN 600, however, the ANN 600 may include many more (or fewer) hidden layers $L_a$, $L_b$, and $L_c$ than are shown.

3. Example Hardware and Software Configurations and Arrangements

Figure 7A:
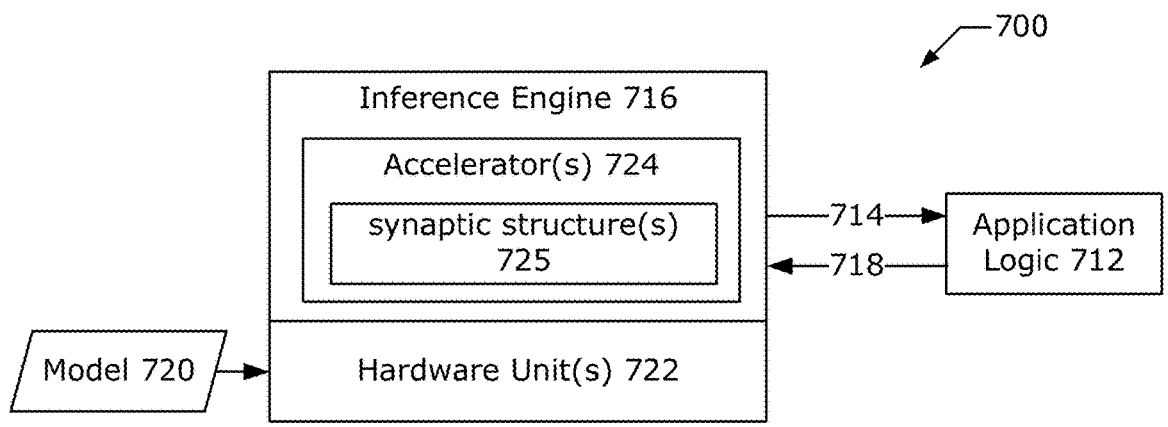
FIG. 7*a* illustrates an example accelerator architecture.

FIG. 7a is an example accelerator architecture 700 for according to various embodiments. The accelerator architecture 700 provides neural network (NN) functionality to application logic 712, and as such, may be referred to as a NN accelerator architecture 700, DNN accelerator architecture 700, and/or the like.

The application logic 712 may include application software and/or hardware components used to perform specification functions. The application logic 712 forwards data 714 to an inference engine 716. The inference engine 716 is a runtime element that delivers a unified application programming interface (API) that integrates a ANN (e.g., DNN(s) or the like) inference with the application logic 712 to provide a result 718 (or output) to the application logic 712.

To provide the inference, the inference engine 716 uses a model 720 that controls how the DNN inference is made on the data 714 to generate the result 718. Specifically, the model 720 includes a topology of layers of a NN. The topology includes an input layer that receives the data 714, an output layer that outputs the result 718, and one or more hidden layers between the input and output layers that provide processing between the data 14 and the result 718. The topology may be stored in a suitable information object, such as an extensible markup language (XML), JavaScript Object Notation (JSON), and/or other suitable data structure, file, and/or the like. The model 720 may also include weights and/or biases for results for any of the layers while processing the data 714 in the inference using the DNN.

The inference engine 716 may be implemented using and/or connected to hardware unit(s) 722. The inference engine 716 at least in some embodiments is an element that applies logical rules to a knowledge base to deduce new information. The knowledge base at least in some embodiments is any technology used to store complex structured and/or unstructured information used by a computing system (e.g., compute node 750 of FIG. 7). The knowledge base may include storage devices, repositories, database management systems, and/or other like elements.

Furthermore, the inference engine 716 includes one or more accelerators 724 that provide hardware acceleration for the DNN inference using one or more hardware units 722. The accelerator(s) 724 are software and/or hardware element(s) specifically tailored/designed as hardware acceleration for AI/ML applications and/or AI/ML tasks. The one or more accelerators 724 may include one or more processing element (PE) arrays and/or a multiply-and-accumulate (MAC) architecture in the form of a plurality of synaptic structures 725. The accelerator(s) 724 may correspond to the acceleration circuitry 764 of FIG. 7 described infra.

The hardware unit(s) 722 may include one or more processors and/or one or more programmable devices. As examples, the processors may include central processing units (CPUs), graphics processing units (GPUs), dedicated AI accelerator Application Specific Integrated Circuits (ASICs), vision processing units (VPUs), tensor processing units (TPUs) and/or Edge TPUs, Neural Compute Engine (NCE), Pixel Visual Core (PVC), photonic integrated circuit (PIC) or optical/photonic computing device, and/or the like. The programmable devices may include, for example, logic arrays, programmable logic devices (PLDs) such as complex PLDs (CPLDs), field-programmable gate arrays (FPGAs), programmable ASICs, programmable System-on-Chip (SoC), and the like. The processor(s) and/or programmable devices may correspond to processor circuitry 752 and/or acceleration circuitry 764 of FIG. 7.

Figure 7B:
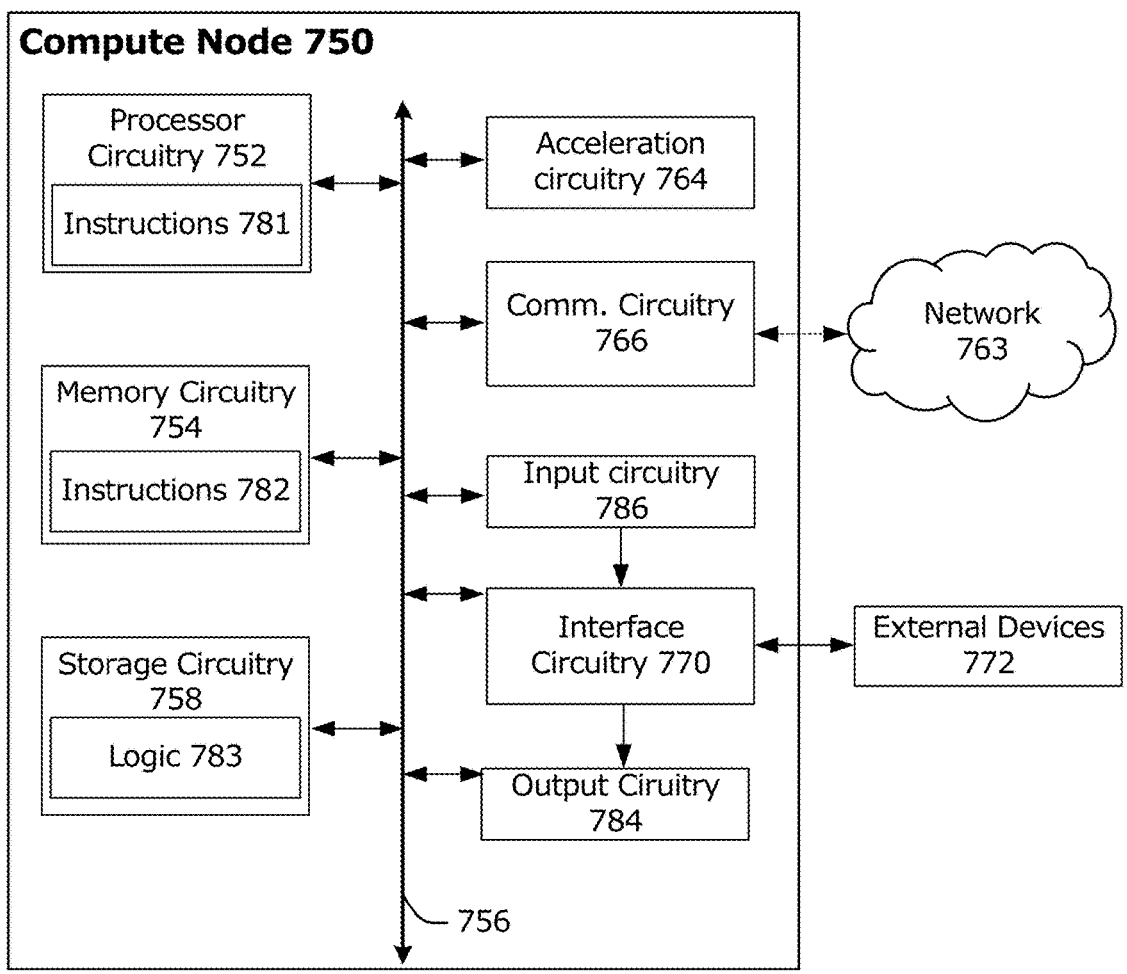
FIG. 7*b* illustrates an example components of a computing system.

FIG. 7b illustrates an example of components that may be present in a compute node 750 for implementing the techniques (e.g., operations, processes, methods, and methodologies) described herein. FIG. 7b provides a view of the components of node 750 when implemented as part of a computing device (e.g., as a mobile device, a base station, server computer, gateway, appliance, etc.). In some implementations, the compute node 750 may be an application server, edge server, cloud compute node, or other like device/system configured to operate the MLAS system 100 (or portions thereof). In one example, the compute node 750 may be an application server that operates the MLASI 110b, and another compute node 750 may be an edge or cloud compute node that operates the MLAS function 200. Additionally or alternatively, the compute node 750 may be an application server, edge server, cloud compute node, or the like that operates some or all of the process 800 discussed previously. The compute node 750 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the compute node 750, or as components otherwise incorporated within a chassis of a larger system. For one embodiment, at least one processor 752 may be packaged together with computational logic 782 and configured to practice aspects of various example embodiments described herein to form a System in Package (SiP) or a System on Chip (SoC).

The node 750 includes processor circuitry in the form of one or more processors 752. The processor circuitry 752 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 752 may include one or more hardware accelerators (e.g., same or similar to acceleration circuitry 764), which may be microprocessors, programmable processing devices (e.g., FPGA, ASIC, etc.), or the like. The one or more accelerators may include, for example, computer vision and/or deep learning accelerators. In some implementations, the processor circuitry 752 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 752 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 752 may be coupled with or may include memory/storage and may be configured to execute instructions 781 stored in the memory/storage to enable various applications or operating systems to run on the platform 750. The processors (or cores) 752 is configured to operate application software to provide a specific service to a user of the platform 750. In some embodiments, the processor(s) 752 may be a special-purpose processor(s)/controller(s) configured (or configurable) to operate according to the various embodiments herein.

As examples, the processor(s) 752 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 752 may be a part of a system on a chip (SoC), System-in-Package (SiP), a multi-chip package (MCP), and/or the like, in which the processor(s) 752 and other components are formed into a single integrated circuit, or a single package, such as the Edison™ or Galileo™ SoC boards from Intel® Corporation. Other examples of the processor(s) 752 are mentioned elsewhere in the present disclosure.

The node 750 may include or be coupled to acceleration circuitry 764, which may be embodied by one or more AI/ML accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as complex (CPLDs) or high complexity PLDs (HCPLDs), and/or other forms of specialized processors or circuitry designed to accomplish one or more specialized tasks. These tasks may include AI/ML processing (e.g., including training, inferencing, and classification operations), visual data processing, network data processing, object detection, rule analysis, or the like. In FPGA-based implementations, the acceleration circuitry 764 may comprise logic blocks or logic fabric and other interconnected resources that may be programmed (configured) to perform various functions, such as the procedures, methods, functions, etc. of the various embodiments discussed herein. In such implementations, the acceleration circuitry 764 may also include memory cells (e.g., EPROM, EEPROM, flash memory, static memory (e.g., SRAM, anti-fuses, etc.) used to store logic blocks, logic fabric, data, etc. in LUTs and the like.

In some implementations, the processor circuitry 752 and/or acceleration circuitry 764 may include hardware elements specifically tailored for machine learning functionality, such as for operating performing ANN operations such as those discussed herein. In these implementations, the processor circuitry 752 and/or acceleration circuitry 764 may be, or may include, an AI engine chip that can run many different kinds of AI instruction sets once loaded with the appropriate weightings and training code. Additionally or alternatively, the processor circuitry 752 and/or acceleration circuitry 764 may be, or may include, AI accelerator(s), which may be one or more of the aforementioned hardware accelerators designed for hardware acceleration of AI applications. As examples, these processor(s) or accelerators may be a cluster of artificial intelligence (AI) GPUs, tensor processing units (TPUs) developed by Google® Inc., Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 752 and/or acceleration circuitry 764 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like. In some hardware-based implementations, individual subsystems of node 750 may be operated by the respective AI accelerating co-processor(s), AI GPUs, TPUs, or hardware accelerators (e.g., FPGAs, ASICs, DSPs, SoCs, etc.), etc., that are configured with appropriate logic blocks, bit stream(s), etc. to perform their respective functions.

The node 750 also includes system memory 754. Any number of memory devices may be used to provide for a given amount of system memory. As examples, the memory 754 may be, or include, volatile memory such as random access memory (RAM), static RAM (SRAM), dynamic RAM (DRAM), synchronous DRAM (SDRAM), RAIVIBUS® Dynamic Random Access Memory (RDRAM®), and/or any other desired type of volatile memory device. Additionally or alternatively, the memory 754 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory 754 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to microDIMMs or MiniDIMMs.

Storage circuitry 758 provides persistent storage of information such as data, applications, operating systems and so forth. In an example, the storage 758 may be implemented via a solid-state disk drive (SSDD) and/or high-speed electrically erasable memory (commonly referred to as "flash memory"). Other devices that may be used for the storage 758 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 754 and/or storage circuitry 758 may also incorporate three-dimensional (3D) cross-point (XPOINT) memories from Intel® and Micron®.

The memory circuitry 754 and/or storage circuitry 758 is/are configured to store computational logic 783 in the form of software, firmware, microcode, or hardware-level instructions to implement the techniques described herein. The computational logic 783 may be employed to store working copies and/or permanent copies of programming instructions, or data to create the programming instructions, for the operation of various components of system 700 (e.g., drivers, libraries, application programming interfaces (APIs), etc.), an operating system of system 700, one or more applications, and/or for carrying out the embodiments discussed herein. The computational logic 783 may be stored or loaded into memory circuitry 754 as instructions 782, or data to create the instructions 782, which are then accessed for execution by the processor circuitry 752 to carry out the functions described herein. The processor circuitry 752 and/or the acceleration circuitry 764 accesses the memory circuitry 754 and/or the storage circuitry 758 over the IX 756. The instructions 782 direct the processor circuitry 752 to perform a specific sequence or flow of actions, for example, as described with respect to flowchart(s) and block diagram(s) of operations and functionality depicted previously. The various elements may be implemented by assembler instructions supported by processor circuitry 752 or high-level languages that may be compiled into instructions 781, or data to create the instructions 781, to be executed by the processor circuitry 752. The permanent copy of the programming instructions may be placed into persistent storage devices of storage circuitry 758 in the factory or in the field through, for example, a distribution medium (not shown), through a communication interface (e.g., from a distribution server (not shown)), over-the-air (OTA), or any combination thereof.

The IX 756 couples the processor 752 to communication circuitry 766 for communications with other devices, such as a remote server (not shown) and the like. The communication circuitry 766 is a hardware element, or collection of hardware elements, used to communicate over one or more networks 763 and/or with other devices. In one example, communication circuitry 766 is, or includes, transceiver circuitry configured to enable wireless communications using any number of frequencies and protocols such as, for example, the Institute of Electrical and Electronics Engineers (IEEE) 802.11 (and/or variants thereof), IEEE 802.15.4, Bluetooth® and/or Bluetooth® low energy (BLE), ZigBee®, LoRaWAN™ (Long Range Wide Area Network), a cellular protocol such as 3GPP LTE and/or Fifth Generation (5G)/New Radio (NR), and/or the like. Additionally or alternatively, communication circuitry 766 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others. In some embodiments, the communication circuitry 766 may include or otherwise be coupled with the an accelerator 724 including one or more synaptic devices/structures 725, etc., as described previously.

The IX 756 also couples the processor 752 to interface circuitry 770 that is used to connect node 750 with one or more external devices 772. The external devices 772 may include, for example, sensors, actuators, positioning circuitry (e.g., global navigation satellite system (GNSS)/ Global Positioning System (GPS) circuitry), client devices, servers, network appliances (e.g., switches, hubs, routers, etc.), integrated photonics devices (e.g., optical neural network (ONN) integrated circuit (IC) and/or the like), and/or other like devices.

In some optional examples, various input/output (I/O) devices may be present within or connected to, the node 750, which are referred to as input circuitry 786 and output circuitry 784 in FIG. 7. The input circuitry 786 and output circuitry 784 include one or more user interfaces designed to enable user interaction with the platform 750 and/or peripheral component interfaces designed to enable peripheral component interaction with the platform 750. Input circuitry 786 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 784 may be included to show information or otherwise convey information, such as sensor readings, actuator position(s), or other like information. Data and/or graphics may be displayed on one or more user interface components of the output circuitry 784. Output circuitry 784 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 750. The output circuitry 784 may also include speakers and/or other audio emitting devices, printer(s), and/or the like. Additionally or alternatively, sensor(s) may be used as the input circuitry 784 (e.g., an image capture device, motion capture device, or the like) and one or more actuators may be used as the output device circuitry 784 (e.g., an actuator to provide haptic feedback or the like). Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

The components of the node 750 may communicate over the interconnect (IX) 756. The IX 756 may include any number of technologies, including Industry Standard Architecture (ISA) and/or extended ISA (EISA), FASTBUS, Low Pin Count (LPC) bus, Inter-Integrated Circuit (I²C), Serial Peripheral Interface (SPI), power management bus (PMBus), peripheral component IX (PCI), PCI express (PCIe), PCI extended (PCIx), Intel® QuickPath IX (QPI), Intel® Ultra Path IX (UPI), Intel® Accelerator Link, Compute Express Link (CXL), Coherent Accelerator Processor Interface (CAPI) and/or OpenCAPI, Intel® Omni-Path Architecture (OPA), RapidIO™, cache coherent interconnect for accelerators (CCIX), Gen-Z Consortium, HyperTransport and/or Lightning Data Transport (LDT), NVLink provided by NVIDIA®, InfiniBand (IB), Time-Trigger Protocol (TTP), FlexRay, PROFIBUS, Ethernet, Universal Serial Bus (USB), point-to-point interfaces, and/or any number of other IX technologies. The IX 756 may be a proprietary bus, for example, used in a SoC based system.

The number, capability, and/or capacity of the elements of system 700 may vary, depending on whether computing system 700 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the computing device system 700 may comprise one or more components of a data center, a desktop computer, a workstation, a laptop, a smartphone, a tablet, a digital camera, a smart appliance, a smart home hub, a network appliance, and/or any other device/system that processes data.

4. Example Implementations

Figure 8:
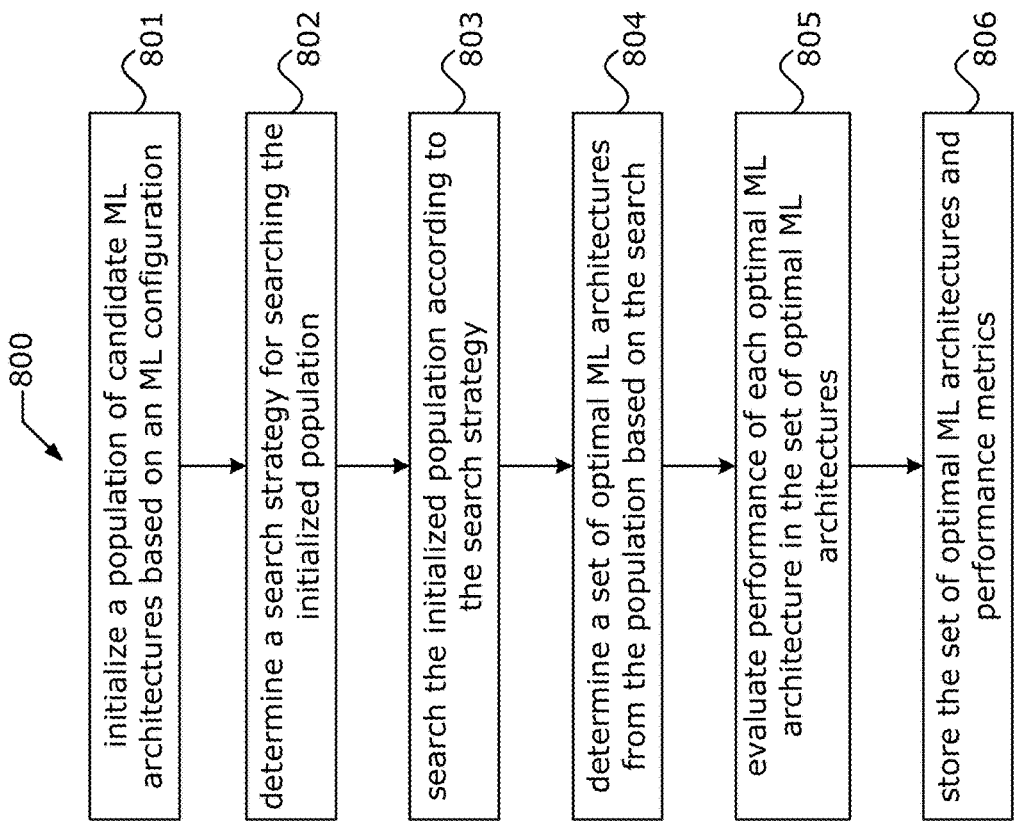

FIG. 8 depicts a process 800 for identifying ML architectures, which may be performed by the MLAS function 200. Process 800 begins at operation 801 where the MLAS function 200 (or the population initializer 201) initializes a population of candidate ML architectures based on an ML configuration, which may indicate or include a supernet or individual ML parameters, as well as HPI. At operation 802, the MLAS function 200 (or the architecture search type engine 202) determines a search strategy for searching the initialized population. Here, the search strategy may be the informed warm start 211 or the heuristic warm start 212. At operation 803, the MLAS function 200 (or the MOCG 203) searches the initialized population according to the search strategy. At operation 804, the MLAS function 200 (or the MOCG 203) determines, based on the search, a set of optimal ML architectures from the population. Here, the set of optimal ML architectures are ML architectures in the population that fit a set or combination of ML parameters and HPI included in the ML configuration better than other ML architectures in the population (e.g., goodness of fit, fitness criteria, etc.). Additionally or alternatively, the set of optimal ML architectures are ML architectures in the population have better (predicted) performance metrics in comparison with other ML architectures in the population. At operation 805, the MLAS function 200 (or the performance metric evaluator 204) evaluates performance metrics of each optimal ML architecture in the set of optimal ML architectures. This evauluation may be done using actual performance metrics measure from operating the optimal ML architectures using test data, or predicted using proxy functions. At operation 806, the MLAS function 200 stores the set of optimal ML architectures in the MLAR 140. After performance of operation 806, process 800 may end or repeat as necessary.

Figure 9:
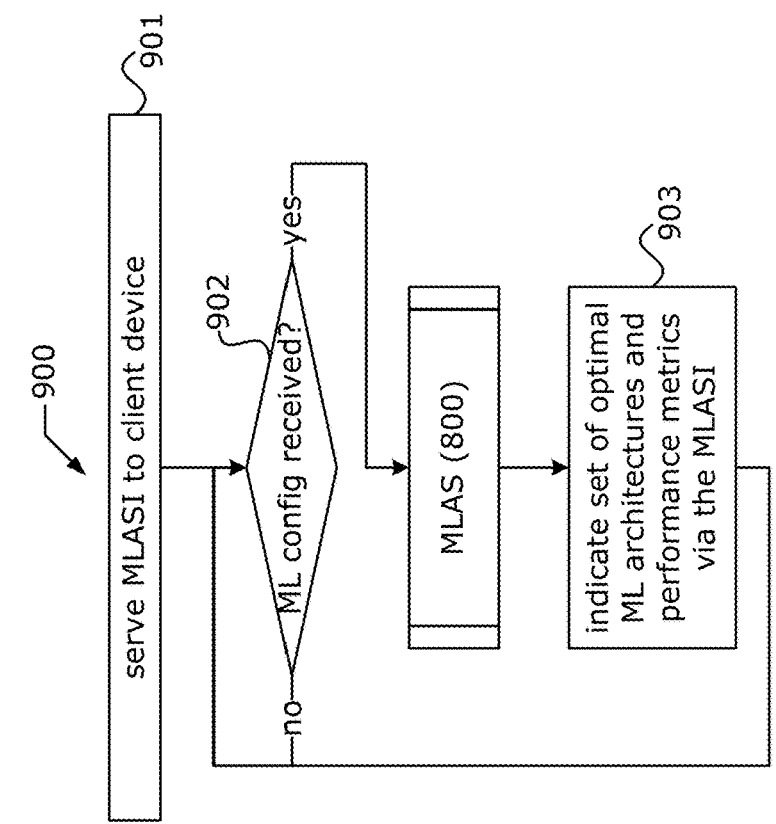
FIGS. 8 and 9 depict example procedures that may be used to practice the various embodiments discussed herein.

FIG. 9 depicts a process 900 for operating the MLASI 110, which may be performed by the MLAS system 100. Process 900 begins at operation 901 where the MLAS system 100 serves the MLASI 110b to the client device 101. Here, the client device 101 may operate the MLASI 110b to interact with the MLASI 110a as discussed previously. At operation 902, the MLAS system 100 determines whether an ML config. 105 has been received from the client device 101 through the MLASI 110. If no ML config. 105 has been received, the MLAS system 100 loops back to monitor for an ML config. 105. If an ML config. 105 has been received, the MLAS system 100 performs an MLAS such as by performing process 800 of FIG. 8. At operation 903, the MLAS system 100 indicates the discovered ML architectures (e.g., set of optimal ML architectures determined through process 800) and the determined performance metrics for each discovered ML architectures via the MLASI 110. After operation 903, the MLAS system 100 loops back to operation 902 to check for a new or updated ML config. 105.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example A01 includes a method for identifying machine learning (ML) architectures, the method comprising: operating a population initializer to initialize a set of candidate ML architectures based on an ML configuration; operating an architecture search type engine to determine a search strategy for searching the initialized set of candidate ML architectures; operating a multi-objective candidate generator (MOCG) to: search the initialized set of candidate ML architectures according to the search strategy, and determine, based on the search, a set of optimal ML architectures from the set of candidate ML architectures, the set of optimal ML architectures are ML architectures in the set of candidate ML architectures that satisfy more of a combination of ML parameters and hardware platform information (HPI) included in the ML configuration than other ML architectures in the set of candidate ML architectures; and operating a performance metric evaluator to evaluate performance of each optimal ML architecture in the set of optimal ML architectures.

Example A02 includes the method of example A01 and/or some other example(s) herein, wherein the ML configuration includes a supernetwork, and the set of candidate ML architectures include sub-networks, wherein the sub-networks have fewer parameters than the supernetwork.

Example A03 includes the method of examples A01-A02 and/or some other example(s) herein, further comprising: operating a warm start mechanism to analyze characteristics of ML architectures that were previously found to be optimal ML architectures based on the ML parameters; and initialize the set of candidate ML architectures based on the analyzed characteristics.

Example A04 includes the method of example A03 and/or some other example(s) herein, wherein the warm start mechanism is an informed warm start mechanism, and the operating the population initializer comprises: generating the set of candidate ML architectures using information from one or more previously generated optimal ML architectures, the previously generated optimal ML architectures being ML architectures determined to solve a same or similar ML task indicated by the ML configuration, are within a same or similar ML domain indicated by the ML configuration, or are associated with a same or similar hardware platform indicated by the HPI.

Example A05 includes the method of example A03 and/or some other example(s) herein, wherein the warm start mechanism is an heuristic warm start mechanism, and the operating the population initializer comprises: generating the set of candidate ML architectures using one or more heuristics derived from at least one previously generated optimal ML architecture, the one or more heuristics indicating a relationship between individual ML parameters of the at least one previously generated optimal ML architecture.

Example A06 includes the method of examples A01-A05 and/or some other example(s) herein, wherein the search strategy is a constrained search strategy, wherein the search of the initialized set of candidate ML architectures is based on one or more constraints between two or ML parameters of the candidate ML architectures in the set of candidate ML architectures.

Example A07 includes the method of examples A01-A05 and/or some other example(s) herein, wherein the search strategy is a full search strategy, wherein the search of the initialized set of candidate ML architectures is a search of an entirety of the set of candidate ML architectures.

Example A08 includes the method of examples A01-A07 and/or some other example(s) herein, wherein determining the set of optimal ML architectures, and the operating the MOCG comprises: operating one or more optimization algorithms to solve a multi-objective optimization problem.

Example A09 includes the method of example A08 and/or some other example(s) herein, wherein the one or more optimization algorithms include one or more of grid search, random search, Bayesian optimization, an evolutionary algorithm, a tree-structured Parzen estimator, and a user-defined optimization algorithm.

Example A10 includes the method of example A09 and/or some other example(s) herein, wherein the evolutionary algorithm is Strength Pareto Evolutionary Algorithm 2 (SPEA-2) or Nondominated Sorting Genetic Algorithm-II.

Example A11 includes the method of examples A01-A10 and/or some other example(s) herein, wherein generating the set of optimal ML architectures, and the operating the MOCG comprises: determining the set of optimal ML architectures to be a set of Pareto optimal solutions.

Example A12 includes the method of example A11 and/or some other example(s) herein, wherein the operating the MOCG comprises: for each optimization iteration of a set of optimization iterations until convergence is reached, rank each candidate ML architecture in the set of candidate ML architectures; perform crowding distance sorting mechanism to select individual candidate ML architectures from the ranked set of candidate ML architectures; and carry the selected individual candidate ML architectures into a next optimization iteration.

Example A13 includes the method of examples A01-A12 and/or some other example(s) herein and/or some other example(s) herein, wherein the operating the performance metric evaluator comprises: operating each optimal ML architecture using a test dataset; and measuring one or more performance metrics based on the operation of respective optimal ML architectures in the set of optimal ML architectures.

Example A14 includes the method of examples A01-A12 and/or some other example(s) herein, wherein the operating the performance metric evaluator comprises: predicting one or more performance metrics of each optimal ML architecture using one or more proxy functions.

Example A15 includes the method of example A14 and/or some other example(s) herein, wherein the one or more proxy functions include one or more of associative arrays, mapping functions, dictionaries, hash tables, look-up tables (LUTs), linked lists, ML classifiers, parameter counting, computational throughput metrics, Jacobian covariance functions, saliency pruning functions, channel pruning functions, heuristic functions, and hyper-heuristic functions.

Example A16 includes the method of examples A01-A15 and/or some other example(s) herein, wherein the HPI includes an identifier of a hardware platform on which a selected one of the set of optimal ML architectures is to be deployed.

Example A17 includes the method of examples A01-A15 and/or some other example(s) herein, wherein the HPI includes technical details of one or more hardware components of a hardware platform.

Example A18 includes a method for operating a machine learning architecture search interface (MLASI), the method comprising: serving the MLASI to a client device; and in response to receipt of an individual ML configuration from the client device via the MLASI: performing the method of any one of examples A01-A17 and/or some other example(s) herein, and indicating, via the MLASI, the set of optimal ML architectures and the determined performance metrics for each optimal ML architecture.

Example B01 includes a method for operating a machine learning architecture search interface (MLASI), the method comprising: serving the MLASI to a client device; and in response to receipt of an individual ML configuration from the client device via the MLASI: determining a set of candidate ML architectures based on a supernetwork indicated by the individual ML configuration, performing multi-objective optimization on the population to determine a set of optimal ML architectures that satisfy more of a set of ML parameters and hardware platform information (HPI) included in the ML configuration better than other ML architectures in the population, wherein the HPI includes technical details of a hardware platform or one or more hardware components of the hardware platform, determining performance metrics for each optimal ML architecture in the set of optimal ML architectures, and indicating, via the MLASI, the set of optimal ML architectures and the determined performance metrics for each optimal ML architecture.

Example B02 includes the method of example B01 and/or some other example(s) herein, further comprising: receiving, via the MLASI, a selection of an optimal ML architecture from among the indicated set of optimal ML architectures; and sending, via the MLASI, the selected optimal ML architecture.

Example B03 includes the method of examples B01-B02 and/or some other example(s) herein, wherein the set of optimal ML architectures is a Pareto frontier of a multi-objective optimization problem, and the indication of the set of optimal ML architectures is a graphical representation of the Pareto frontier.

Example B04 includes the method of examples B01-B03 and/or some other example(s) herein, wherein determining the set of candidate ML architectures comprises: determining the set of candidate ML architectures to include ML architectures that were previously found to be optimal ML architectures based on the ML parameters and the HPI; or determining the set of candidate ML architectures using one or more heuristics derived from at least one previously generated optimal ML architecture, the one or more heuristics indicating a relationship between individual ML parameters of the at least one previously generated optimal ML architecture.

Example B05 includes the method of examples B01-B04 and/or some other example(s) herein, further comprising: determining a search strategy for searching the determined set of candidate ML architectures, wherein the search strategy is one of a full search strategy or a constrained search strategy, the full search strategy including a search of an entirety of the set of candidate ML architectures, and the constrained search strategy including a search of the set of candidate ML architectures based on one or more constraints between two or ML parameters of the candidate ML architectures in the set of candidate ML architectures.

Example B06 includes the method of examples B01-B05 and/or some other example(s) herein, wherein performing the multi-objective optimization comprises: operating one or more optimization algorithms to solve a multi-objective optimization problem, wherein the one or more optimization algorithms include one or more of grid search, random search, Bayesian optimization, a genetic algorithm, a tree-structured Parzen estimator, Strength Pareto Evolutionary Algorithm 2 (SPEA-2), Nondominated Sorting Genetic Algorithm-II, and a user-defined optimization algorithm.

Example B07 includes the method of examples B01-B06 and/or some other example(s) herein, wherein determining the performance metrics comprises: operating each optimal ML architecture using a test dataset; and measuring the performance metrics from the operation of respective optimal ML architectures in the set of optimal ML architectures.

Example B08 includes the method of examples B01-B06 and/or some other example(s) herein, wherein determining performance metrics comprises: predicting one or more performance metrics of each optimal ML architecture using one or more proxy functions, wherein the one or more proxy functions include one or more of associative arrays, mapping functions, dictionaries, hash tables, look-up tables (LUTs), linked lists, ML classifiers, parameter counting, computational throughput metrics, Jacobian covariance functions, saliency pruning functions, channel pruning functions, heuristic functions, and hyper-heuristic functions.

Example B09 includes the method of examples B01-B08 and/or some other example(s) herein, wherein the HPI includes technical data of a hardware platform and/or technical data of one or more hardware components of the hardware platform.

Example Z01 includes one or more computer readable media comprising instructions, wherein execution of the instructions by processor circuitry is to cause the processor circuitry to perform the method of any one of examples A01-A18, B01-B09, and/or any other aspect discussed herein. Example Z02 includes a computer program comprising the instructions of example Z01. Example Z03 includes an Application Programming Interface defining functions, methods, variables, data structures, and/or protocols for the computer program of example Z02. Example Z04 includes an apparatus comprising circuitry loaded with the instructions of example Z01. Example Z05 includes an apparatus comprising circuitry operable to run the instructions of example Z01. Example Z06 includes an integrated circuit comprising one or more of the processor circuitry of example Z01 and the one or more computer readable media of example Z01. Example Z07 includes a computing system comprising the one or more computer readable media and the processor circuitry of example Z01. Example Z08 includes an apparatus comprising means for executing the instructions of example Z01. Example Z09 includes a signal generated as a result of executing the instructions of example Z01. Example Z10 includes a data unit generated as a result of executing the instructions of example Z01. Example Z11 includes the data unit of example Z10, the data unit is a datagram, network packet, data frame, data segment, a Protocol Data Unit (PDU), a Service Data Unit (SDU), a message, or a database object. Example Z12 includes a signal encoded with the data unit of example Z10 or Z11. Example Z13 includes an electromagnetic signal carrying the instructions of example Z01. Example Z14 includes an apparatus comprising means for performing the method of any one of examples A01-A18, B01-B09, and/or any other aspect discussed herein.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive the stream of packets (or the following parameters and templates or template values).

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some embodiments refers to the observation and/or quantification of attributes of an object, event, or phenomenon.

The term "accuracy" at least in some embodiments refers to the closeness of one or more measurements to a specific value. The term "precision" at least in some embodiments refers to the closeness of the two or more measurements to each other.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment (UE), end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, Helmut-mounted display devices, augmented reality (AR) devices, virtual reality (VR) devices, mixed reality (MR) devices, and/or other like systems or devices.

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "application" at least in some embodiments refers to a computer program designed to carry out a specific task other than one relating to the operation of the computer itself. Additionally or alternatively, term "application" at least in some embodiments refers to a complete and deployable package, environment to achieve a certain function in an operational environment.

The term "algorithm" at least in some embodiments refers to an unambiguous specification of how to solve a problem or a class of problems by performing calculations, input/output operations, data processing, automated reasoning tasks, and/or the like.

The terms "instantiate," "instantiation," and the like at least in some embodiments refers to the creation of an instance. An "instance" also at least in some embodiments refers to a concrete occurrence of an object, which may occur, for example, during execution of program code.

The term "reference" at least in some embodiments refers to data useable to locate other data and may be implemented a variety of ways (e.g., a pointer, an index, a handle, a key, an identifier, a hyperlink, etc.).

The term "artificial intelligence" or "AI" at least in some embodiments refers to any intelligence demonstrated by machines, in contrast to the natural intelligence displayed by humans and other animals. Additionally or alternatively, the term "artificial intelligence" or "AI" at least in some embodiments refers to the study of "intelligent agents" and/or any device that perceives its environment and takes actions that maximize its chance of successfully achieving a goal.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), echo state network (ESN), etc.), spiking NN (SNN), deep stacking network (DSN), Markov chain, perception NN, generative adversarial network (GAN), transformers, stochastic NNs (e.g., Bayesian Network (BN), Bayesian belief network (BBN), a Bayesian NN (BNN), Deep BNN (DBNN), Dynamic BN (DBN), probabilistic graphical model (PGM), Boltzmann machine, restricted Boltzmann machine (RBM), Hopfield network or Hopfield NN, convolutional deep belief network (CDBN), etc.), Linear Dynamical System (LDS), Switching LDS (SLDS), Optical NNs (ONNs), an NN for reinforcement learning (RL) and/or deep RL (DRL), and/or the like.

The term "attention" in the context of machine learning and/or neural networks, at least in some embodiments refers to a technique that mimics cognitive attention, which enhances important parts of a dataset where the important parts of the dataset may be determined using training data by gradient descent. The term "dot-product attention" at least in some embodiments refers to an attention technique that uses the dot product between vectors to determine attention. The term "multi-head attention" at least in some embodiments refers to an attention technique that combines several different attention mechanisms to direct the overall attention of a network or subnetwork.

The term "attention model" or "attention mechanism" at least in some embodiments refers to input processing techniques for neural networks that allow the neural network to focus on specific aspects of a complex input, one at a time until the entire dataset is categorized. The goal is to break down complicated tasks into smaller areas of attention that are processed sequentially. Similar to how the human mind solves a new problem by dividing it into simpler tasks and solving them one by one. The term "attention network" at least in some embodiments refers to an artificial neural networks used for attention in machine learning.

The term "backpropagation" at least in some embodiments refers to a method used in NNs to calculate a gradient that is needed in the calculation of weights to be used in the NN; "backpropagation" is shorthand for "the backward propagation of errors." Additionally or alternatively, the term "backpropagation" at least in some embodiments refers to a method of calculating the gradient of neural network parameters. Additionally or alternatively, the term "backpropagation" or "back pass" at least in some embodiments refers to a method of traversing a neural network in reverse order, from the output to the input layer through any intermediary hidden layers.

The term "Bayesian optimization" at least in some embodiments refers to a sequential design strategy for global optimization of black-box functions that does not assume any functional forms.

The term "classification" in the context of ML at least in some embodiments refers to an ML technique for determining the classes to which various data points belong. Here, the term "class" or "classes" at least in some embodiments refers to categories, and are sometimes called "targets" or "labels." Classification is used when the outputs are restricted to a limited set of quantifiable properties. Classification algorithms may describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples. ML algorithms for classification may be referred to as a "classifier." Examples of classifiers include linear classifiers, k-nearest neighbor (kNN), decision trees, random forests, support vector machines (SVMs), Bayesian classifiers, convolutional neural networks (CNNs), among many others (note that some of these algorithms can be used for other ML tasks as well).

The term "convolution" at least in some embodiments refers to a convolutional operation or a convolutional layer of a CNN.

The term "context" or "contextual information" at least in some embodiments refers to any information about any entity that can be used to effectively reduce the amount of reasoning required (via filtering, aggregation, and inference) for decision making within the scope of a specific application. Additionally or alternatively, the term "context" or "contextual information" at least in some embodiments refers to a high-dimensional real-valued vector.

The term "convolutional filter" at least in some embodiments refers to a matrix having the same rank as an input matrix, but a smaller shape. In machine learning, a convolutional filter is mixed with an input matrix in order to train weights.

The term "convolutional layer" at least in some embodiments refers to a layer of a DNN in which a convolutional filter passes along an input matrix (e.g., a CNN). Additionally or alternatively, the term "convolutional layer" at least in some embodiments refers to a layer that includes a series of convolutional operations, each acting on a different slice of an input matrix.

The term "convolutional neural network" or "CNN" at least in some embodiments refers to a neural network including at least one convolutional layer. Additionally or alternatively, the term "convolutional neural network" or "CNN" at least in some embodiments refers to a DNN designed to process structured arrays of data such as images.

The term "convolutional operation" at least in some embodiments refers to a mathematical operation on two functions (e.g., $f$ and g) that produces a third function ($f*g$) that expresses how the shape of one is modified by the other where the term "convolution" may refer to both the result function and to the process of computing it. Additionally or alternatively, term "convolutional" at least in some embodiments refers to the integral of the product of the two functions after one is reversed and shifted, where the integral is evaluated for all values of shift, producing the convolution function. Additionally or alternatively, term "convolutional" at least in some embodiments refers to a two-step mathematical operation element-wise multiplication of the convolutional filter and a slice of an input matrix (the slice of the input matrix has the same rank and size as the convolutional filter); and (2) summation of all the values in the resulting product matrix.

The term "covariance" at least in some embodiments refers to a measure of the joint variability of two random variables, wherein the covariance is positive if the greater values of one variable mainly correspond with the greater values of the other variable (and the same holds for the lesser values such that the variables tend to show similar behavior), and the covariance is negative when the greater values of one variable mainly correspond to the lesser values of the other.

The term "ensemble averaging" at least in some embodiments refers to the process of creating multiple models and combining them to produce a desired output, as opposed to creating just one model.

The term "ensemble learning" or "ensemble method" at least in some embodiments refers to using multiple learning algorithms to obtain better predictive performance than could be obtained from any of the constituent learning algorithms alone.

The term "event", in probability theory, at least in some embodiments refers to a set of outcomes of an experiment (e.g., a subset of a sample space) to which a probability is assigned. Additionally or alternatively, the term "event" at least in some embodiments refers to a software message indicating that something has happened. Additionally or alternatively, the term "event" at least in some embodiments refers to an object in time, or an instantiation of a property in an object. Additionally or alternatively, the term "event" at least in some embodiments refers to a point in space at an instant in time (e.g., a location in space-time). Additionally or alternatively, the term "event" at least in some embodiments refers to a notable occurrence at a particular point in time.

The term "experiment" in probability theory, at least in some embodiments refers to any procedure that can be repeated and has a well-defined set of outcomes, known as a sample space.

The term "feature" at least in some embodiments refers to an individual measureable property, quantifiable property, or characteristic of a phenomenon being observed. Additionally or alternatively, the term "feature" at least in some embodiments refers to an input variable used in making predictions. At least in some embodiments, features may be represented using numbers/numerals (e.g., integers), strings, variables, ordinals, real-values, categories, and/or the like.

The term "feature engineering" at least in some embodiments refers to a process of determining which features might be useful in training an ML model, and then converting raw data into the determined features. Feature engineering is sometimes referred to as "feature extraction."

The term "feature extraction" at least in some embodiments refers to a process of dimensionality reduction by which an initial set of raw data is reduced to more manageable groups for processing. Additionally or alternatively, the term "feature extraction" at least in some embodiments refers to retrieving intermediate feature representations calculated by an unsupervised model or a pre-trained model for use in another model as an input. Feature extraction is sometimes used as a synonym of "feature engineering."

The term "feature map" at least in some embodiments refers to a function that takes feature vectors (or feature tensors) in one space and transforms them into feature vectors (or feature tensors) in another space. Additionally or alternatively, the term "feature map" at least in some embodiments refers to a function that maps a data vector (or tensor) to feature space. Additionally or alternatively, the term "feature map" at least in some embodiments refers to a function that applies the output of one filter applied to a previous layer. In some embodiments, the term "feature map" may also be referred to as an "activation map".

The term "feature vector" at least in some embodiments, in the context of ML, refers to a set of features and/or a list of feature values representing an example passed into a model.

The term "forward propagation" or "forward pass" at least in some embodiments, in the context of ML, refers to the calculation and storage of intermediate variables (including outputs) for a neural network in order from the input layer to the output layer through any hidden layers between the input and output layers.

The term "hidden layer", in the context of ML and NNs, at least in some embodiments refers to an internal layer of neurons in an ANN that is not dedicated to input or output. The term "hidden unit" refers to a neuron in a hidden layer in an ANN.

The term "hyperparameter" at least in some embodiments refers to characteristics, properties, and/or parameters for an ML process that cannot be learnt during a training process. Hyperparameter are usually set before training takes place, and may be used in processes to help estimate model parameters. Examples of hyperparameters include model size (e.g., in terms of memory space, bytes, number of layers, etc.); training data shuffling (e.g., whether to do so and by how much); number of evaluation instances, iterations, epochs (e.g., a number of iterations or passes over the training data), or episodes; number of passes over training data; regularization; learning rate (e.g., the speed at which the algorithm reaches (converges to) optimal weights); learning rate decay (or weight decay); momentum; number of hidden layers; size of individual hidden layers; weight initialization scheme; dropout and gradient clipping thresholds; the C value and sigma value for SVMs; the k in k-nearest neighbors; number of branches in a decision tree; number of clusters in a clustering algorithm; vector size; word vector size for NLP and NLU; and/or the like.

The term "inference engine" at least in some embodiments refers to a component of a computing system that applies logical rules to a knowledge base to deduce new information.

The terms "instance-based learning" or "memory-based learning" in the context of ML at least in some embodiments refers to a family of learning algorithms that, instead of performing explicit generalization, compares new problem instances with instances seen in training, which have been stored in memory. Examples of instance-based algorithms include k-nearest neighbor, and the like), decision tree Algorithms (e.g., Classification And Regression Tree (CART), Iterative Dichotomiser 3 (ID 3), C4.5, chi-square automatic interaction detection (CHAID), etc.), Fuzzy Decision Tree (FDT), and the like), Support Vector Machines (SVM), Bayesian Algorithms (e.g., Bayesian network (BN), a dynamic BN (DBN), Naive Bayes, and the like), and ensemble algorithms (e.g., Extreme Gradient Boosting, voting ensemble, bootstrap aggregating ("bagging"), Random Forest and the like.

The term "intelligent agent" at least in some embodiments refers to an a software agent or other autonomous entity which acts, directing its activity towards achieving goals upon an environment using observation through sensors and consequent actuators (i.e. it is intelligent). Intelligent agents may also learn or use knowledge to achieve their goals.

The term "iteration" at least in some embodiments refers to the repetition of a process in order to generate a sequence of outcomes, wherein each repetition of the process is a single iteration, and the outcome of each iteration is the starting point of the next iteration. Additionally or alternatively, the term "iteration" at least in some embodiments refers to a single update of a model's weights during training.

The term "knowledge base" at least in some embodiments refers to any technology used to store complex structured and/or unstructured information used by a computing system.

The term "knowledge distillation" in machine learning, at least in some embodiments refers to the process of transferring knowledge from a large model to a smaller one.

The term "loss function" or "cost function" at least in some embodiments refers to an event or values of one or more variables onto a real number that represents some "cost" associated with the event. A value calculated by a loss function may be referred to as a "loss" or "error". Additionally or alternatively, the term "loss function" or "cost function" at least in some embodiments refers to a function used to determine the error or loss between the output of an algorithm and a target value. Additionally or alternatively, the term "loss function" or "cost function" at least in some embodiments refers to a function are used in optimization problems with the goal of minimizing a loss or error.

The term "machine learning" or "ML" at least in some embodiments refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm at least in some embodiments refers to different concepts than the term "ML model," these terms may be used interchangeably for the purposes of the present disclosure. Furthermore, the term "AI/ML application" or the like at least in some embodiments refers to an application that contains some AI/ML models and application-level descriptions. ML techniques generally fall into the following main types of learning problem categories: supervised learning, unsupervised learning, and reinforcement learning.

The term "mathematical model" at least in some embodiments refer to a system of postulates, data, and inferences presented as a mathematical description of an entity or state of affairs including governing equations, assumptions, and constraints.

The terms "model parameter" and/or "parameter" in the context of ML, at least in some embodiments refer to values, characteristics, and/or properties that are learnt during training. Additionally or alternatively, "model parameter" and/or "parameter" in the context of ML, at least in some embodiments refer to a configuration variable that is internal to the model and whose value can be estimated from the given data. Model parameters are usually required by a model when making predictions, and their values define the skill of the model on a particular problem. Examples of such model parameters/parameters include weights (e.g., in an ANN); constraints; support vectors in a support vector machine (SVM); coefficients in a linear regression and/or logistic regression; word frequency, sentence length, noun or verb distribution per sentence, the number of specific character n-grams per word, lexical diversity, etc., for natural language processing (NLP) and/or natural language understanding (NLU); and/or the like.

The term "momentum" at least in some embodiments refers to an aggregate of gradients in gradient descent. Additionally or alternatively, the term "momentum" at least in some embodiments refers to a variant of the stochastic gradient descent algorithm where a current gradient is replaced with m (momentum), which is an aggregate of gradients.

The term "objective function" at least in some embodiments refers to a function to be maximized or minimized for a specific optimization problem. In some cases, an objective function is defined by its decision variables and an objective. The objective is the value, target, or goal to be optimized. The specific objective function chosen depends on the specific problem to be solved and the objectives to be optimized. Constraints may also be defined to restrict the values the decision variables can assume thereby influencing the objective value (output) that can be achieved. During an optimization process, an objective function's decision variables are often changed or manipulated within the bounds of the constraints to improve the objective function's values. In general, the difficulty in solving an objective function increases as the number of decision variables included in that objective function increases. The term "decision variable" refers to a variable that represents a decision to be made.

The term "optimization" at least in some embodiments refers to an act, process, or methodology of making something (e.g., a design, system, or decision) as fully perfect, functional, or effective as possible. Optimization usually includes mathematical procedures such as finding the maximum or minimum of a function. The term "optimal" at least in some embodiments refers to a most desirable or satisfactory end, outcome, or output. The term "optimum" at least in some embodiments refers to an amount or degree of something that is most favorable to some end. The term "optima" at least in some embodiments refers to a condition, degree, amount, or compromise that produces a best possible result. Additionally or alternatively, the term "optima" at least in some embodiments refers to a most favorable or advantageous outcome or result.

The term "population" at least in some embodiments refers to a set of similar items or events which is of interest for some question, experiment, and/or optimization problem.

The term "probability" at least in some embodiments refers to a numerical description of how likely an event is to occur and/or how likely it is that a proposition is true. The term "probability distribution" at least in some embodiments refers to a mathematical function that gives the probabilities of occurrence of different possible outcomes for an experiment or event.

The term "fit" at least in some embodiments refers to a measure of how well a solution completely satisfies or matches one or more requirements, constraints, conditions, or the like. Additionally or alternatively, the term "fit criteria" and/or "fit criterion" a quantification of one or more requirements, constraints, conditions, etc., that demonstrates a standard that a solution must reach to demonstrate that the solution is a fit and/or satisfies or matches the one or more requirements, constraints, conditions, etc. Additionally or alternatively, the term "fit" and/or "goodness of fit" at least in some embodiments refers to how well a model fits a set of observations and/or a measure oif discrepancy between observed values and the values expected under the model in question.

The term "quantile" at least in some embodiments refers to a cut point(s) dividing a range of a probability distribution into continuous intervals with equal probabilities, or dividing the observations in a sample in the same way. The term "quantile function" at least in some embodiments refers to a function that is associated with a probability distribution of a random variable, and the specifies the value of the random variable such that the probability of the variable being less than or equal to that value equals the given probability. The term "quantile function" may also be referred to as a percentile function, percent-point function, or inverse cumulative distribution function.

The terms "regression algorithm" and/or "regression analysis" in the context of ML at least in some embodiments refers to a set of statistical processes for estimating the relationships between a dependent variable (often referred to as the "outcome variable") and one or more independent variables (often referred to as "predictors", "covariates", or "features"). Examples of regression algorithms/models include logistic regression, linear regression, gradient descent (GD), stochastic GD (SGD), and the like.

The term "reinforcement learning" or "RL" at least in some embodiments refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, temporal difference learning, and deep RL.

The term "sample space" in probability theory (also referred to as a "sample description space" or "possibility space") of an experiment or random trial at least in some embodiments refers to a set of all possible outcomes or results of that experiment.

The term "self-attention" at least in some embodiments refers to an attention mechanism relating different positions of a single sequence in order to compute a representation of the sequence. Additionally or alternatively, the term "self-attention" at least in some embodiments refers to an attention mechanism applied to a single context instead of across multiple contexts wherein queries, keys, and values are extracted from the same context.

The term "softmax" or "softmax function" at least in some embodiments refers to a generalization of the logistic function to multiple dimensions; the "softmax function" is used in multinomial logistic regression and is often used as the last activation function of a neural network to normalize the output of a network to a probability distribution over predicted output classes.

The term "supervised learning" at least in some embodiments refers to an ML technique that aims to learn a function or generate an ML model that produces an output given a labeled data set. Supervised learning algorithms build models from a set of data that contains both the inputs and the desired outputs. For example, supervised learning involves learning a function or model that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms.

The term "tensor" at least in some embodiments refers to an object or other data structure represented by an array of components that describe functions relevant to coordinates of a space. Additionally or alternatively, the term "tensor" at least in some embodiments refers to a generalization of vectors and matrices and/or may be understood to be a multidimensional array. Additionally or alternatively, the term "tensor" at least in some embodiments refers to an array of numbers arranged on a regular grid with a variable number of axes. At least in some embodiments, a tensor can be defined as a single point, a collection of isolated points, or a continuum of points in which elements of the tensor are functions of position, and the Tensor forms a "tensor field". At least in some embodiments, a vector may be considered as a one dimensional (1D) or first order tensor, and a matrix may be considered as a two dimensional (2D) or second order tensor. Tensor notation may be the same or similar as matrix notation with a capital letter representing the tensor and lowercase letters with subscript integers representing scalar values within the tensor.

The term "unsupervised learning" at least in some embodiments refers to an ML technique that aims to learn a function to describe a hidden structure from unlabeled data. Unsupervised learning algorithms build models from a set of data that contains only inputs and no desired output labels. Unsupervised learning algorithms are used to find structure in the data, like grouping or clustering of data points. Examples of unsupervised learning are K-means clustering, principal component analysis (PCA), and topic modeling, among many others. The term "semi-supervised learning at least in some embodiments refers to ML algorithms that develop ML models from incomplete training data, where a portion of the sample input does not include labels.

The term "vector" at least in some embodiments refers to a tuple of one or more values called scalars, and a "feature vector" may be a vector that includes a tuple of one or more features.

The term "benchmark" or "benchmarking" at least in some embodiments refers to a measure of performance using a specific indicator resulting in a metric of performance. Additionally or alternatively, the term "benchmark" or "benchmarking" at least in some embodiments refers to the act of running a computer program, a set of programs, or other operations, in order to assess the relative performance of an object, normally by running a number of standard tests and trials against it.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus for identifying machine learning (ML) architectures, the apparatus comprising:
   interface circuitry to obtain an ML configuration, the ML configuration including a current set of input search parameters;
   machine-readable instructions; and
   at least one processor circuit to be programmed based on the machine-readable instructions to:
      identify a set of previous ML architectures based on previous searches using respective previous sets of input search parameters, the previous sets of input search parameters different from the current set of input search parameters but having at least one of an ML task, an ML domain or hardware platform information in common with the current set of search parameters;
      initialize a set of candidate ML architectures to include the set of previous ML architectures;
      search the set of candidate ML architectures based on the current set of input search parameters;
      determine, based on the search, an output set of ML architectures from the set of candidate ML architectures, the output set of ML architectures to satisfy one or more of the current set of search parameters; and
      evaluate performance of ones of the ML architectures in the output set of ML architectures.

2. The apparatus of claim 1, wherein the ML configuration includes a super-network, and one or more of the at least one processor circuit is to generate sub-networks of the super-network to include in the set of candidate ML architectures, the sub-networks to have fewer ML parameters than the super-network.

3. The apparatus of claim 1, wherein one or more of the at least one processor circuit is to search the set of candidate ML architectures based on one or more constraints between two or more ML parameters of the candidate ML architectures in the initialized set of candidate ML architectures.

4. The apparatus of claim 1, wherein the search is based on an algorithm, and one or more of the at least one processor circuit is to select the algorithm from a plurality of algorithms based on at least one of hardware platform information or a performance metric included in the ML configuration.

5. The apparatus of claim 4, wherein the algorithms include one or more of grid search, random search, Bayesian optimization, an evolutionary algorithm, a tree-structured Parzen estimator, or a user-defined optimization algorithm.

6. The apparatus of claim 5, wherein the algorithms include the evolutionary algorithm, and the evolutionary algorithm is one of Strength Pareto Evolutionary Algorithm 2 (SPEA-2) or Nondominated Sorting Genetic Algorithm-II.

7. The apparatus of claim 1, wherein one or more of the at least one processor circuit is to determine the set of optimal ML architectures to be a set of Pareto optimal solutions.

8. The apparatus of claim 7, wherein one or more of the at least one processor circuit is to:
for successive iterations until convergence is reached:
rank ones of the candidate ML architectures in the set of candidate ML architectures;
perform crowding distance sorting to select individual candidate ML architectures from the ranked set of candidate ML architectures; and
carry the selected individual candidate ML architectures into a next optimization iteration.

9. The apparatus of claim 1, wherein one or more of the at least one processor circuit is to:
measure one or more performance metrics based on operation of ones of the ML architectures in the output set of ML architectures using a test dataset.

10. The apparatus of claim 1, wherein one or more of the at least one processor circuit is to:
predict one or more performance metrics of ones of the ML architectures in the output set of ML architectures using one or more proxy functions.

11. The apparatus of claim 10, wherein the one or more proxy functions include one or more of associative arrays, mapping functions, dictionaries, hash tables, look-up tables (LUTs), linked lists, ML classifiers, parameter counting, computational throughput metrics, Jacobian covariance functions, saliency pruning functions, channel pruning functions, heuristic functions, or hyper-heuristic functions.

12. The apparatus of claim 1, wherein the ML configuration includes an identifier of a hardware platform on which a selected one of the output set of ML architectures is to be deployed.

13. The apparatus of claim 1, wherein the ML configuration includes data of one or more hardware components of a hardware platform.

14. One or more non-transitory computer readable media (NTCRM) comprising instructions to cause at least one processor circuit to at least:
access a machine learning (ML) configuration from a client device;
determine a set of candidate ML architectures based on sub-networks included in a super-network indicated by the ML configuration;
determine, based on the set of candidate ML architectures, an output set of ML architectures that satisfy at least one of an ML parameter or hardware platform information (HPI) included in the ML configuration;
determine performance metrics for the set of optimal ML architectures; and
cause presentation of information corresponding to the output set of ML architectures and the determined performance metrics at the client device.

15. The one or more NTCRM of claim 14, wherein the instructions are to cause one or more of the at least one processor circuit to:
obtain a selection of one of the MP architectures from among the output set of ML architectures; and
cause the selected one of the ML architectures to be sent to the client device.

16. The one or more NTCRM of claim 14, wherein the instructions are to cause one or more of the at least one processor circuit to determine the output set of ML architectures to be a Pareto frontier of a multi-objective optimization problem, and the information includes a graphical representation of the Pareto frontier.

17. The one or more NTCRM of claim 14, wherein the instructions are to cause one or more of the at least one processor circuit to:
determine the set of candidate ML architectures to include first ones of the sub-networks that were previously found to satisfy the at least one of the ML parameter or the HPI; or
determine the set of candidate ML architectures to include second ones of the sub-networks that satisfy one or more heuristics derived from at least one previously generated output ML architecture, the one or more heuristics to indicate a relationship between individual ML parameters of the at least one previously generated output ML architecture.

18. The one or more NTCRM of claim 14, wherein the instructions are to cause one or more of the at least one processor circuit to:
search the set of candidate ML architectures based on one or more constraints between two or more ML parameters of the candidate ML architectures in the set of candidate ML architectures.

19. The one or more NTCRM of claim 14, wherein the instructions are to cause one or more of the at least one processor circuit to:
operate one or more algorithms to determine the output set of ML architectures based on the set of candidate ML architectures, the one or more optimization algorithms including one or more of grid search, random search, Bayesian optimization, a genetic algorithm, a tree-structured Parzen estimator, Strength Pareto Evolutionary Algorithm 2 (SPEA-2), Nondominated Sorting Genetic Algorithm-II, or a user-defined optimization algorithm.

20. The one or more NTCRM of claim 14, wherein the instructions are to cause one or more of the at least one processor circuit to:
measure the performance metrics based on operation of ones of the ML architectures in the output set of ML architectures using a test dataset.

21. The one or more NTCRM of claim 14, wherein the instructions are to cause one or more of the at least one processor circuit to:
predict one or more of the performance metrics based on one or more proxy functions, the one or more proxy functions including one or more of associative arrays, mapping functions, dictionaries, hash tables, look-up tables (LUTs), linked lists, ML classifiers, parameter counting, computational throughput metrics, Jacobian covariance functions, saliency pruning functions, channel pruning functions, heuristic functions, or hyper-heuristic functions.

22. The one or more NTCRM of claim 14, wherein one or more of the at least one processor circuit is to determine the output set of ML architectures to satisfy at least the HPI, and the HPI includes technical data of a hardware platform or technical data of one or more hardware components of the hardware platform.

* * * * *